US012494479B2

(12) United States Patent
Takeda et al.

(10) Patent No.: US 12,494,479 B2
(45) Date of Patent: Dec. 9, 2025

(54) COMPOSITE PARTICLES, NEGATIVE ELECTRODE MATERIAL, AND LITHIUM-ION SECONDARY BATTERY

(71) Applicant: Group14 Technologies, Inc., Woodinville, WA (US)

(72) Inventors: Akifumi Takeda, Tokyo (JP); Masato Fujita, Tokyo (JP); Yuji Ito, Tokyo (JP); Hirofumi Inoue, Tokyo (JP)

(73) Assignee: Group14 Technologies, Inc., Woodinville, WA (US)

( * ) Notice: Subject to any disclaimer, the term of this patent is extended or adjusted under 35 U.S.C. 154(b) by 486 days.

(21) Appl. No.: 17/927,789

(22) PCT Filed: May 28, 2021

(86) PCT No.: PCT/JP2021/020499
§ 371 (c)(1),
(2) Date: Nov. 25, 2022

(87) PCT Pub. No.: WO2021/241750
PCT Pub. Date: Dec. 2, 2021

(65) Prior Publication Data
US 2023/0216025 A1    Jul. 6, 2023

(30) Foreign Application Priority Data

May 28, 2020 (JP) .................................. 2020-093159
Jan. 15, 2021 (JP) .................................. 2021-005093

(51) Int. Cl.
*H01M 4/36* (2006.01)
*C01B 32/25* (2017.01)
(Continued)

(52) U.S. Cl.
CPC ............. *H01M 4/364* (2013.01); *C01B 32/25* (2017.08); *C01G 23/005* (2013.01); *C01G 33/00* (2013.01);
(Continued)

(58) Field of Classification Search
CPC ...... H01M 4/364; H01M 4/133; H01M 4/134; H01M 4/386; H01M 4/587;
(Continued)

(56) References Cited

U.S. PATENT DOCUMENTS 6,631,073 B1    10/2003  Sakata et al.
10,424,786 B1    9/2019  Mason et al.
(Continued)

FOREIGN PATENT DOCUMENTS

CN    102214823 A    10/2011
CN    108475779 A    8/2018
(Continued)

*Primary Examiner* — Andrew J. Oyer
(74) *Attorney, Agent, or Firm* — Seed Intellectual Property Law Group LLP

(57) ABSTRACT

An object of the present invention is to provide composite particles capable of suppressing oxidation over time of a Si—C composite material. Composite particles (B) of the present invention contains composite particles (A) containing carbon and silicon; and amorphous layers coating surfaces thereof, where the composite particles (B) have $I_{Si}/I_G$ of 0.10 or more and 0.65 or less, and have R value ($I_D/I_G$) of 1.00 or more and 1.30 or less, when a peak due to silicon is present at 450 to 495 cm$^{-1}$, an intensity of the peak is defined as $I_{Si}$, an intensity of a G band (peak intensity in the vicinity of 1600 cm$^{-1}$) is defined as $I_G$, and an intensity of a D band (peak intensity in the vicinity of 1360 cm$^{-1}$) is defined as $I_D$ in a Raman spectrum, and where the composite
(Continued)

TEM Photograph Of End Portion Of Example 1-5 particles (B) have a full width at half maximum of a peak of a 111 plane of Si of 3.0 deg. or more using a Cu-Kα ray in an XRD pattern.

20 Claims, 5 Drawing Sheets

(51) Int. Cl.
  *C01G 23/00*   (2006.01)
  *C01G 33/00*   (2006.01)
  *H01M 4/133*   (2010.01)
  *H01M 4/134*   (2010.01)
  *H01M 4/38*   (2006.01)
  *H01M 4/587*   (2010.01)
  *H01M 10/0525*   (2010.01)

(52) U.S. Cl.
  CPC ............ *H01M 4/133* (2013.01); *H01M 4/134* (2013.01); *H01M 4/386* (2013.01); *H01M 4/587* (2013.01); *H01M 10/0525* (2013.01)

(58) Field of Classification Search
  CPC ....... H01M 10/0525; H01M 2004/027; H01M 4/366; H01M 4/485; C01B 32/25; C01B 32/21; C01B 33/027; C01B 32/372; C01B 32/05; C01G 23/005; C01G 33/00; C01P 2002/70; C01P 2002/82; C01P 2002/88; C01P 2004/60; C01P 2006/12; C01P 2002/74; C01P 2004/61; C01P 2004/80; Y02E 60/10
  See application file for complete search history.

(56) References Cited

U.S. PATENT DOCUMENTS

| | | | |
|---|---|---|---|
| 2013/0004841 A1 | 1/2013 | Thompkins et al. | |
| 2013/0130115 A1 | 5/2013 | Park et al. | |
| 2017/0152340 A1 | 6/2017 | Geramita et al. | |
| 2019/0267622 A1 | 8/2019 | Sakshaug et al. | |
| 2019/0355971 A1* | 11/2019 | Kim | H01M 4/386 |
| 2020/0152973 A1 | 5/2020 | Mason et al. | |

FOREIGN PATENT DOCUMENTS

| | | |
|---|---|---|
| CN | 108565437 A | 9/2018 |
| GB | 2584615 A | 12/2020 |
| JP | 11-339796 A | 12/1999 |
| JP | 2007-8790 A | 1/2007 |
| JP | 2007-39289 A | 2/2007 |
| JP | 3897709 B2 | 3/2007 |
| JP | 2009-49236 A | 3/2009 |
| JP | 2010-95390 A | 4/2010 |
| JP | 2010-525549 A | 7/2010 |
| JP | 2012-119079 A | 6/2012 |
| JP | 2014-511322 A | 5/2014 |
| JP | 2014-523468 A | 9/2014 |
| JP | 2015-50050 A | 3/2015 |
| JP | 2015-130287 A | 7/2015 |
| JP | 2016-132608 A | 7/2016 |
| JP | 2016-166116 A | 9/2016 |
| JP | 2017-88443 A | 5/2017 |
| JP | 2017-222547 A | 12/2017 |
| JP | 2018-32588 A | 3/2018 |
| JP | 6328107 B2 | 5/2018 |
| JP | 2018-534720 A | 11/2018 |
| JP | 2019-145212 A | 8/2019 |
| JP | 2019-179679 A | 10/2019 |
| KR | 10-2018-0113187 A | 10/2018 |
| KR | 10-2019-0122805 A | 10/2019 |
| WO | 2008/081883 A1 | 7/2008 |
| WO | 2015/019994 A1 | 2/2015 |
| WO | 2018/163778 A1 | 9/2018 |
| WO | 2019/031597 A1 | 2/2019 |
| WO | 2019/131861 A1 | 7/2019 |
| WO | 2019/131862 A1 | 7/2019 |
| WO | 2020/095067 A1 | 5/2020 |

* cited by examiner

[Fig. 1]
TEM Photograph Of End Portion Of Example 1-5
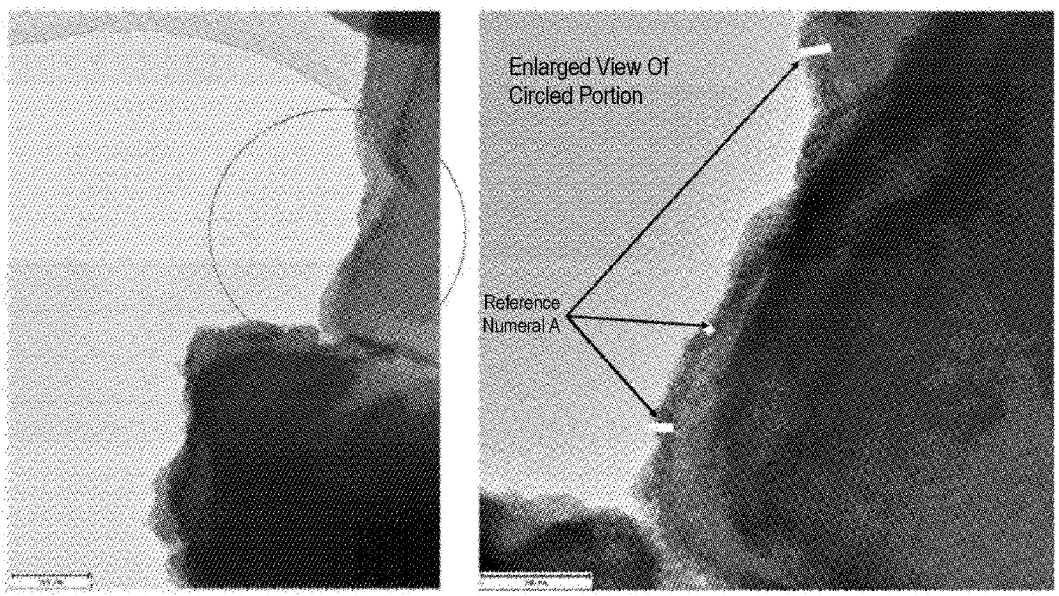
[Fig. 2]
Example 1-1 Raman Spectrum
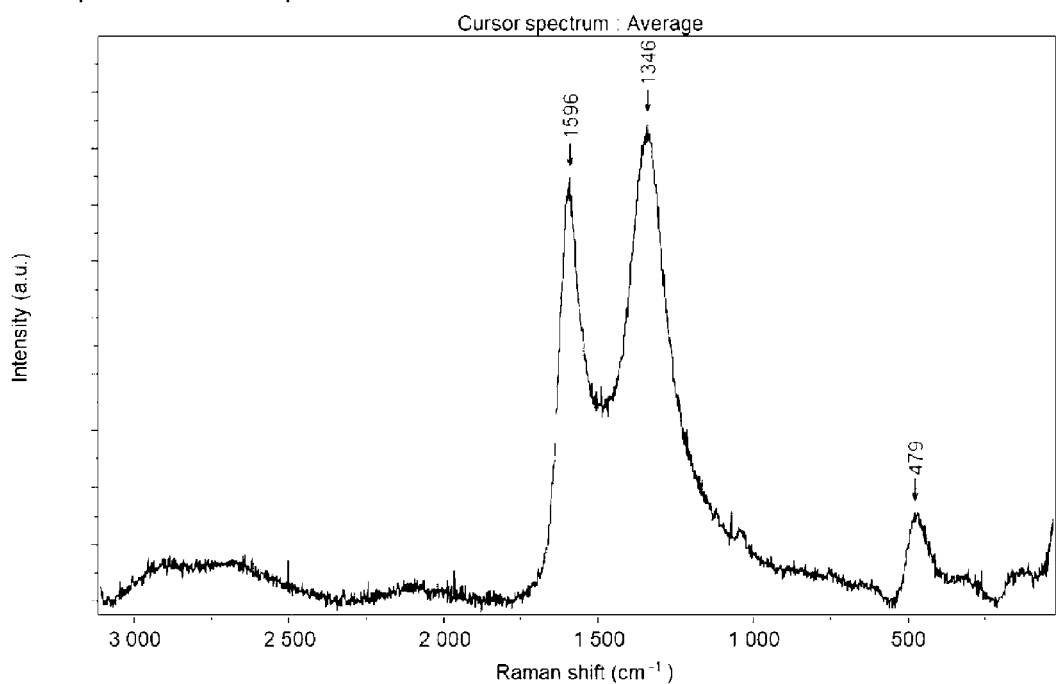

[Fig. 3]
Example 1-8 Raman Spectrum
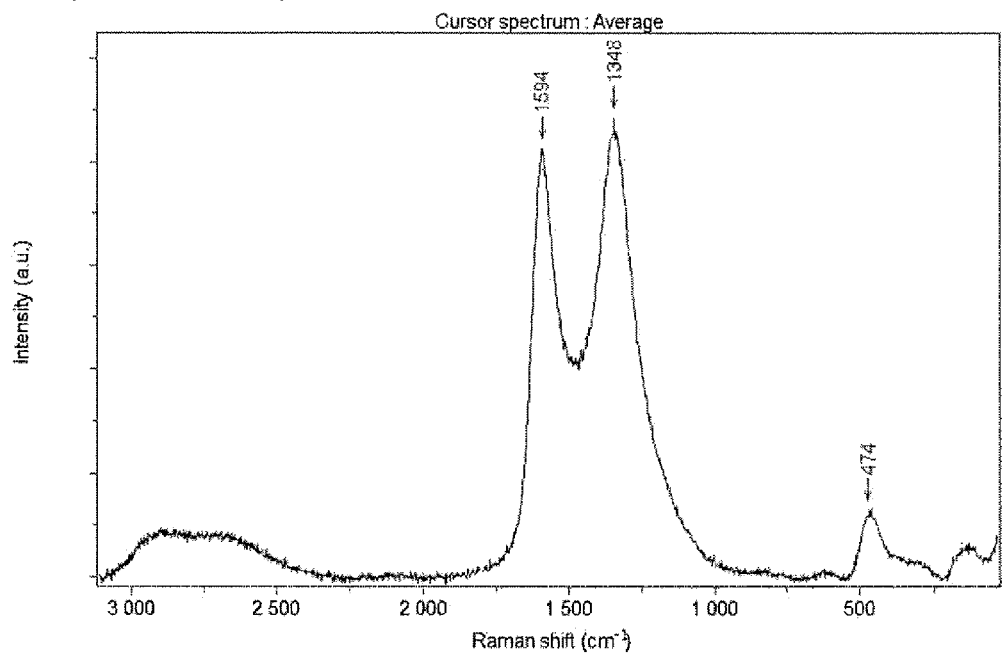
[Fig. 4]
Comparative Example 1-3 Raman Spectrum
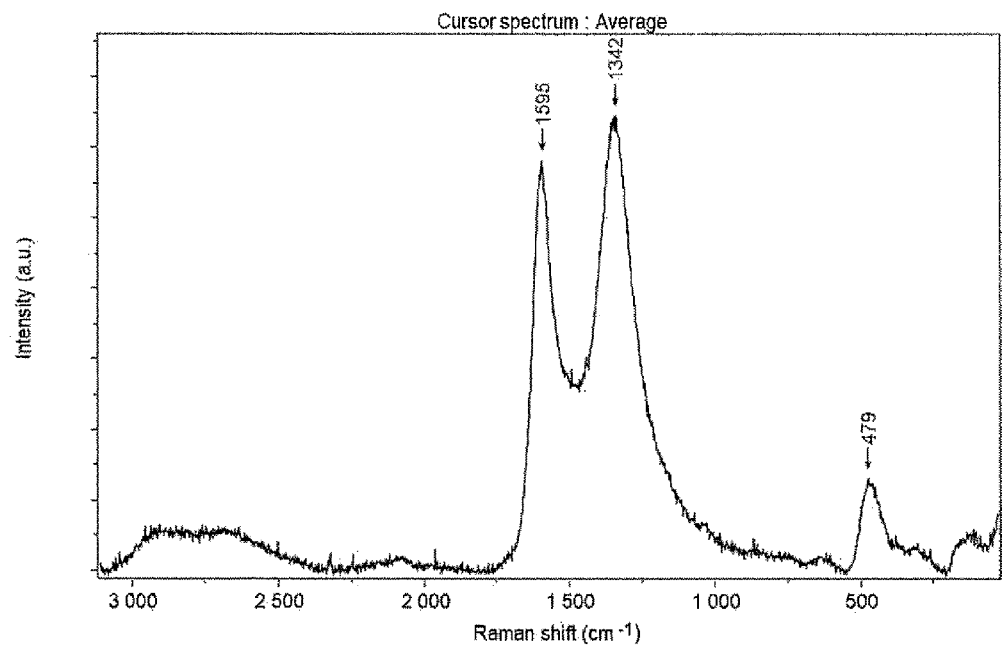

[Fig. 5]
Example 1-1 XRD Pattern
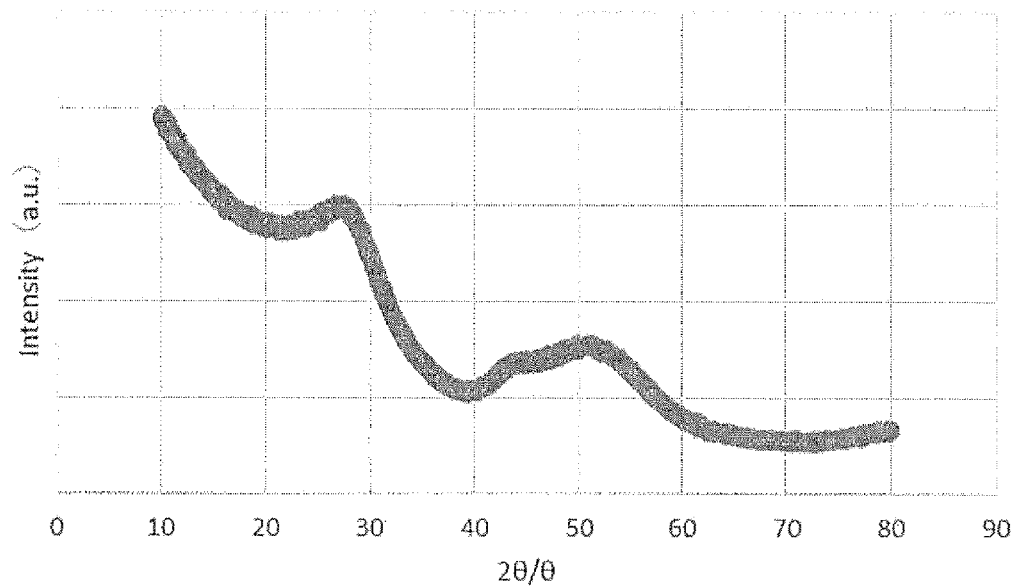
[Fig. 6]
Example 1-2 XRD Pattern
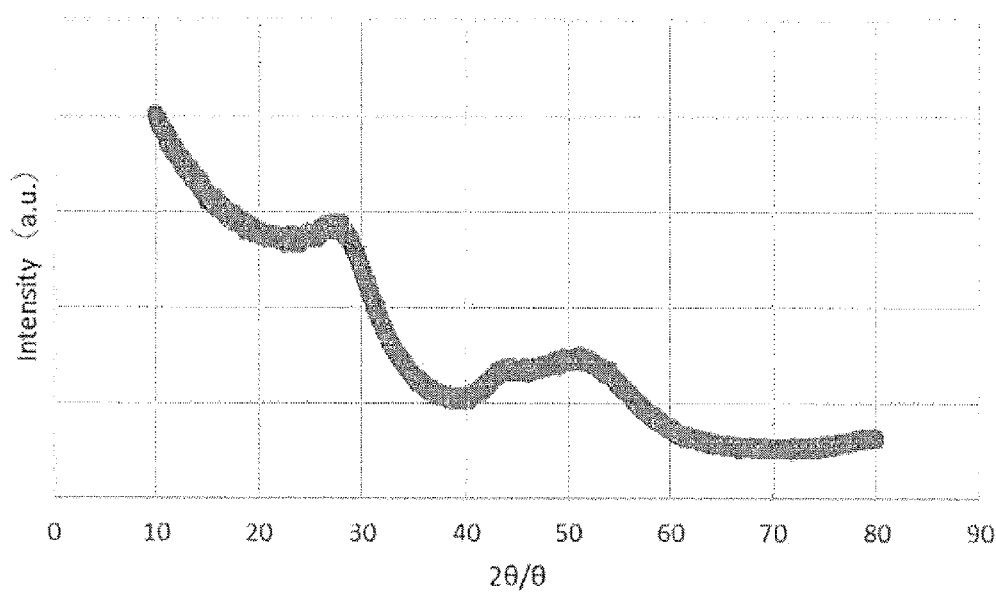

[Fig. 7]
Comparative Example 1-1 XRD Pattern
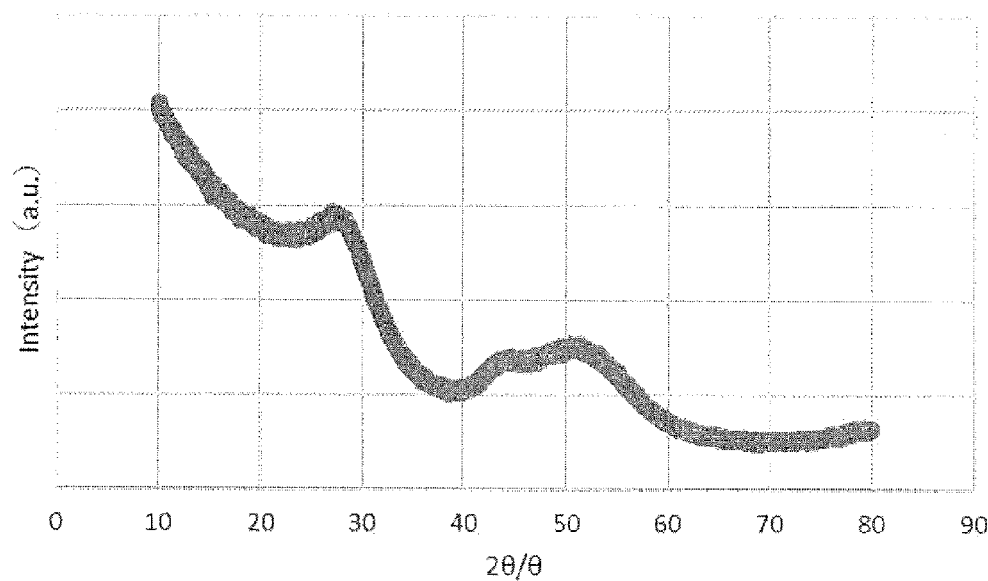
[Fig. 8]
Example 1-1 Sem Image
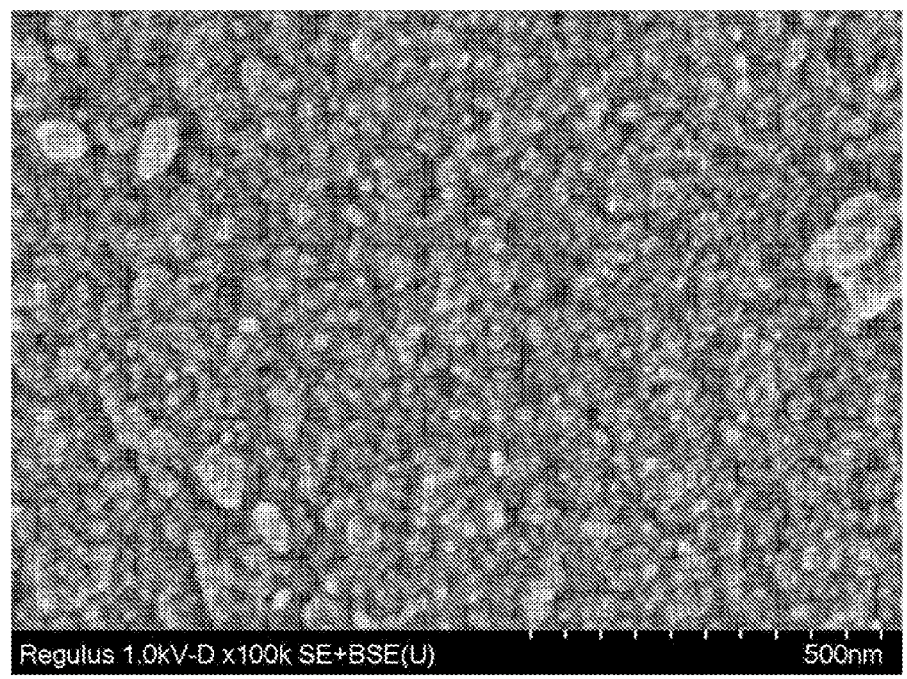

[Fig. 9]
Comparative Example 1-1 Sem Image
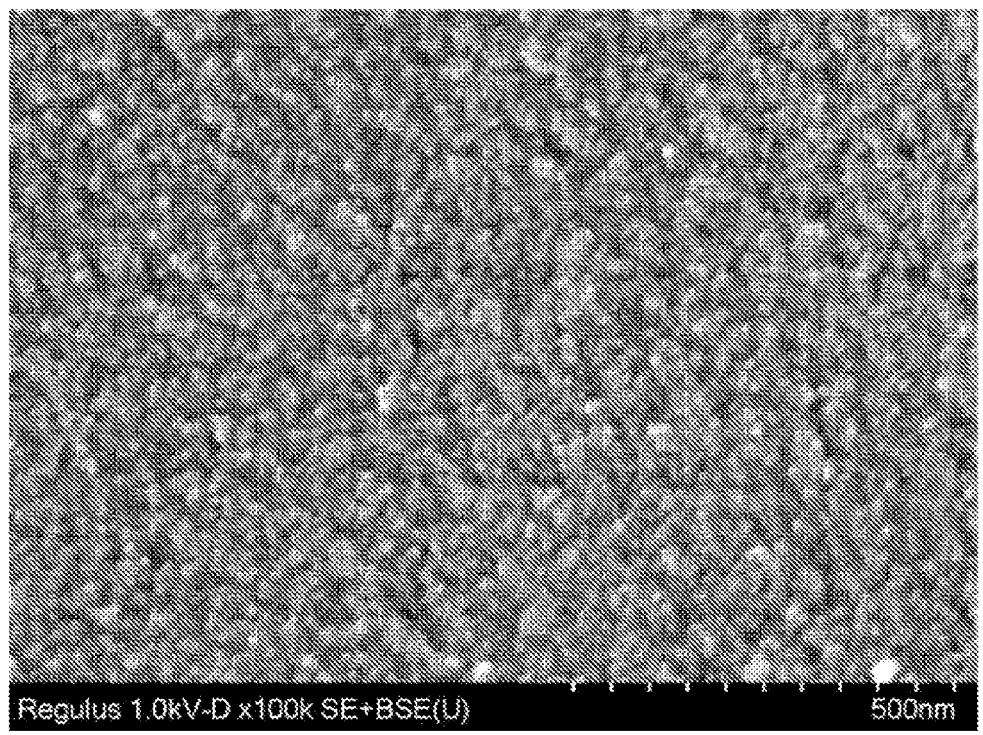

COMPOSITE PARTICLES, NEGATIVE ELECTRODE MATERIAL, AND LITHIUM-ION SECONDARY BATTERY

CROSS REFERENCE TO RELATED APPLICATIONS

This application is a National Stage of International Application No. PCT/JP2021/020499 filed May 28, 2021, claiming priority based on Japanese Patent Application No. 2020-093159 filed May 28, 2020 and Japanese Patent Application No. 2021-005093 filed Jan. 15, 2021.

TECHNICAL FIELD

The present invention relates to a method for producing the particles, a negative electrode material, a negative electrode mixture layer, and a lithium-ion secondary battery.

BACKGROUND ART

Secondary batteries used in IT devices such as smartphones and tablet PCs, vacuum cleaners, electric tools, electric bicycles, drones, and automobiles require negative electrode active materials with high capacity and high output. Silicon (theoretical specific capacity: 4200 mAh/g), which has a higher theoretical specific capacity than currently used graphite (theoretical specific capacity: 372 mAh/g), has attracted attention as a negative electrode active material.

However, silicon (Si) expands and contracts in volume up to about 3 to 4 times in association with electrochemical insertion and deinsertion of lithium. As a result, the silicon particles collapse or are separated from the electrode, and thus it is known that the lithium-ion secondary battery using silicon has extremely low cycle characteristics. For this reason, instead of simply replacing graphite with silicon, it is now being actively studied to use a structure in which the degree of expansion and contraction of the negative electrode material as a whole is reduced. Among them, many attempts have been made to form a composite with carbonaceous materials.

As a negative electrode material having a high capacity and a long life, there is disclosed a silicon-carbon (Si—C) composite material obtained by a method in which silicon is created in the pores of the porous carbon by subjecting the porous carbon particles to silane gas at elevated temperature (JP2018-534720A; Patent Literature 1).

CITATION LIST

Patent Literature

Patent Literature 1: JP2018-534720A

SUMMARY OF INVENTION

Technical Problem

According to the studies by the present inventors, when a material in which a carbonaceous layer is coated on a Si—C composite material is used as a negative electrode material as disclosed in Patent Literature 1, in a case where the Si—C composite material was coated with the carbonaceous layer at a low temperature, the carbon coverage of the Si—C composite material was low, and the Si—C composite material was oxidized over time, and the specific capacity of the negative electrode material decreased. In addition, in a case where the Si—C composite material was coated with the carbonaceous layer at a high temperature, silicon carbide (SiC) was generated, and thus a negative electrode material having a low specific capacity was obtained. An object of the present invention is to provide composite particles capable of suppressing oxidation over time of a Si—C composite material by coating at a low temperature.

Solution to Problem

The present inventors have studied coating at a low temperature in order to suppress the generation of SiC and to obtain a coating layer of good quality. As a result, the present inventors have found that Si—C composite particles coated with a specific amorphous layer can suppress oxidation over time of the Si—C composite particles, and the specific capacity of the material is high because SiC is not generated and have completed the present invention.

The configuration of the present invention is shown below.

[1] Composite particles (B) comprising:
composite particles (A) containing carbon and silicon; and
amorphous layers coating surfaces thereof,
wherein the composite particles (B) have $I_{Si}/I_G$ of 0.10 or more and 0.65 or less, and have R value ($I_D/I_G$) of 1.00 or more and 1.30 or less, when a peak due to silicon is present at 450 to 495 cm$^{-1}$, an intensity of the peak is defined as $I_{Si}$, an intensity of a G band (peak intensity in the vicinity of 1600 cm$^{-1}$) is defined as $I_G$, and an intensity of a D band (peak intensity in the vicinity of 1360 cm$^{-1}$) is defined as $I_D$ in a Raman spectrum, and
wherein the composite particles (B) have a full width at half maximum of a peak of a 111 plane of Si of 3.0 deg. or more using a Cu-Kα ray in an XRD pattern.

[2] The composite particles (B) according to [1], wherein (peak intensity of a 111 plane of SiC)/(peak intensity of the 111 plane of Si) is 0.004 or less in the XRD pattern of the composite particles (B) using the Cu-Kα ray.

[3] The composite particles (B) according to [1] or [2], wherein the amorphous layers coating the surfaces of the composite particles (A) are layers containing at least one selected from the group consisting of a metal oxide and carbon.

[4] The composite particles (B) according to [3], wherein the metal oxide in the amorphous layers coating the surfaces of the composite particles (A) contains at least one selected from the group consisting of oxides of Al, Ti, V, Cr, Hf, Fe, Co, Mn, Ni, Y, Zr, Mo, Nb, La, Ce, Ta, and W and Li-containing oxides.

[5] The composite particles (B) according to [4], wherein a content of the metal element is 0.1% by mass or more and 10.0% by mass or less.

[6] The composite particles (B) according to [3], wherein the metal oxide in the amorphous layers coating the surfaces of the composite particles (A) is lithium titanate ($Li_4TiSO_{12}$), and a content of titanium in the composite particles (B) is 0.1% by mass or more and 10.0% by mass or less.

[7] The composite particles (B) according to [3], wherein the metal oxide in the amorphous layers coating the surfaces of the composite particles (A) is niobium pentoxide ($Nb_2O_5$) or oxygen-deficient niobium oxide ($Nb_2O_x$, x=4.5 to 4.9), and a content of niobium in the composite particles (B) is 0.1% by mass or more and 20.0% by mass or less.

[8] The composite particles (B) according to [3], wherein the amorphous layers coating the surfaces of the composite particles (A) contains only carbon.

[9] The composite particles (B) according to any one of [1] to [8], wherein the amorphous layers coating the surfaces of the composite particles (A) have a thickness of 0.1 nm or more and 30 nm or less.

[10] The composite particles (B) according to any one of [1] to [9], wherein the amorphous layers coating the surfaces of the composite particles (A) have a coverage of 50% or more.

[11] The composite particles (B) according to any one of [1] to [10], wherein an oxygen content in the composite particles (B) is 10% by mass or less.

[12] The composite particles (B) according to any one of [1] to [11], wherein a content of silicon in the composite particles (B) is 20% by mass or more and 70% by mass or less.

[13] The composite particles (B) according to any one of [1] to [12], wherein the composite particles (B) have a $D_{v50}$ of 1.0 μm or more and 30.0 μm or less and a BET specific surface area of 0.3 m$^2$/g or more and 10.0 m$^2$/g or less.

[14] The composite particles (B) according to any one of [1] to [13], wherein the composite particles (B) satisfy at least either of presence of two exothermic peaks at 400° C. to 800° C., and absence of exothermic peak at 700±10° C., in thermal analysis in an air atmosphere.

[15] The composite particles (B) according to any one of [1] to [14], wherein metal oxide particles having an average particle size of 100 nm or less are adhered to the surfaces of the composite particles (B).

[16] A method for producing the composite particles (B) according to any one of [1] to [15], wherein the surfaces of the composite particles (A) are coated with amorphous layers by a physical vapor deposition method (PVD).

[17] A method for producing the composite particles (B) according to any one of [1] to [15], wherein the surfaces of the composite particles (A) are coated with metal oxide layers by an atomic layer deposition method (ALD).

[18] A negative electrode material comprising the composite particles (B) according to any one of [1] to [15].

[19] A negative electrode mixture layer comprising the negative electrode material according to [18].

[20] A lithium-ion secondary battery comprising the negative electrode mixture layer according to [19].

Advantageous Effects of Invention

According to the composite particles (B) of the present invention, it is possible to provide a negative electrode material for a lithium-ion secondary battery capable of maintaining a high specific capacity due to a high utilization rate of Si and excellent in oxidation resistance.

BRIEF DESCRIPTION OF DRAWINGS

FIG. 1 shows TEM photographs of an end portion of composite particles of Example 1-5.
FIG. 2 shows a Raman spectrum of composite particles of Example 1-1.
FIG. 3 shows a Raman spectrum of composite particles of Example 1-8.
FIG. 4 shows a Raman spectrum of composite particles of Comparative Example 1-3.
FIG. 5 shows an XRD pattern of the composite particles of Example 1-1.
FIG. 6 shows an XRD pattern of composite particles of Example 1-2.
FIG. 7 shows an XRD pattern of composite particles of Comparative Example 1-1.
FIG. 8 shows an SEM photograph of the composite particles of Example 1-1.
FIG. 9 shows an SEM photograph of the composite particles of Comparative Example 1-1.

DESCRIPTION OF EMBODIMENTS

Hereinafter, embodiments of the present invention will be described.

<1> Composite Particles (B)

Composite particles (B) of an embodiment contains composite particles (A) containing carbon and silicon, and amorphous layers coating surfaces thereof,
wherein the composite particles (B) have $I_{Si}/I_G$ of 0.10 or more and 0.65 or less, and have R value ($I_D/I_G$) of 1.00 or more and less than 1.30,
when the peak due to silicon is present at 450 to 495 cm$^{-1}$, the intensity of the peak is $I_{Si}$, the intensity of a G band (peak intensity in the vicinity of 1600 cm$^{-1}$) is $I_G$, and the intensity of a D band (peak intensity in the vicinity of 1360 cm$^{-1}$) is $I_D$ in the Raman spectrum,
wherein the composite particles (B) have the full width at half maximum of a peak of the 111 plane of Si of 3.0 deg. or more in the XRD pattern using a Cu-Kα ray.

In the composite particles (B) according to an embodiment, amorphous layers are present on the surfaces of the composite particles (A) containing a carbon material and silicon.

The composite particles (A) are preferably composite particles in which silicon (Si) is precipitated d on the surface and in the pores of the carbon material. The composite particles (A) can usually be obtained by, for example, precipitating amorphous silicon on porous carbon by a chemical vapor deposition (CVD) method using a silicon source such as silane ($SiH_4$).

By forming amorphous layers on the surfaces of the composite particles (A), oxidation of silicon in the composite particles (A) by oxygen in air can be prevented.

The amorphous layer preferably contains at least one selected from the group consisting of a metal oxide, carbon, phosphoric acid, polyphosphoric acid (having a polymerization degree of 3 or more), and salts thereof, and may be a multilayer containing a combination thereof, or two or more kinds thereof may be mixed in one layer. It is more preferable that the amorphous layer contains at least one selected from the group consisting of a metal oxide and carbon. The metal oxide preferably contains at least one selected from the group consisting of oxides of Al, Ti, V, Cr, Hf, Fe, Co, Mn, Ni, Y, Zr, Mo, Nb, La, Ce, Ta, and W and Li-containing oxides, and in particular, more preferably contains at least one selected from the group consisting of lithium titanate ($Li_4Ti_5O_{12}$), niobium pentoxide ($Nb_2O_5$), and oxygen-deficient niobium oxides ($Nb_2O_x$, x=4.5 to 4.9). The metal oxide layer is preferably amorphous. When the amorphous layer contains such a substance, it is possible to further prevent the oxidation of silicon contained in the composite particles (B)

by oxygen in the air. In addition, it has the effect of suppressing side reactions between Si and the electrolytic solution.

The composite particles (B) according to an embodiment has a peak due to silicon (Si) at 450 to 495 cm$^{-1}$ in the Raman spectrum thereof. The presence of a silicon peak in this range means that the composite particles (B) contain amorphous silicon. When silicon is amorphous, expansion and contraction are isotropic during charging and discharging, which improves the cycle characteristics.

In the composite particles (B) according to an embodiment, $I_{Si}/I_G$, which is a ratio of the intensity $I_{Si}$ of the peak due to silicon and the intensity $I_G$ of the G band (peak intensity in the vicinity of 1600 cm$^{-1}$), is 0.10 or more. The present inventors consider that when $I_{Si}/I_G$ is 0.10 or more, silicon is present at a sufficient concentration in the vicinity of the surface inside the composite particles (B). Therefore, a lithium-ion secondary battery using such composite particles (B) as a negative electrode material is excellent in rate characteristics and initial coulombic efficiency. From this viewpoint, $I_{Si}/I_G$ is preferably 0.11 or more, more preferably 0.15 or more, and still more preferably 0.30 or more.

The composite particles (B) according to an embodiment has an $I_{Si}/I_G$ of 0.65 or less. The present inventors consider that when $I_{Si}/I_G$ is 0.65 or less, silicon is not excessively present in the vicinity of the surface inside the composite particles (B). Therefore, the stress of expansion and contraction during insertion and deinsertion of lithium into and from the composite particles (B) is not concentrated in the vicinity of the surface of the composite particles (B). A lithium-ion secondary battery using such composite particles (B) as a negative electrode material has excellent cycle characteristics. From this viewpoint, $I_{Si}/I_G$ is preferably 0.50 or less, more preferably 0.33 or less.

In the composite particles (B) according to an embodiment, R value ($I_D/I_G$), which is a ratio of the intensity $I_D$ of the D band (peak intensity in the vicinity of 1360 cm$^{-1}$) and the intensity $I_G$ of the G band in the Raman spectra thereof, is 1.00 or more. When R value is 1.00 or more, since the crystal structure of the carbon material contained inside the composite particles (B) contains a sufficient amount of defects, amorphous layers having adhesion to the composite particles (A) can be formed, and continuous amorphous layers without being broken and disconnected in the middle can be formed. This leads to an improvement in the initial coulombic efficiency in the lithium-ion secondary battery. From this viewpoint, R value is preferably 1.05 or more, and more preferably 1.10 or more.

The composite particles (B) according to an embodiment has an R value of 1.30 or less. An R value of less than 1.30 means that there are not too many defects in the crystal structure of the carbon material. As a result, the side reaction is reduced, the internal resistance of the battery is lowered, and the rate characteristic is improved. From this viewpoint, R value is preferably 1.25 or less, and more preferably 1.20 or less.

Here, the intensity of the peak is the height from the baseline to the peak top.

In the composite particles (B) according to an embodiment, in the XRD pattern (horizontal axis: 2θ, vertical axis: Integrity) measured by powder XRD using a Cu-Kα ray, the full width at half maximum of the peak of the 111 plane of Si is 3.0 deg. or more. When the full width at half maximum of the peak of the 111 plane of Si is 3.0 deg. or more, the crystallites are small, which leads to suppression of cracking of silicon in association with charging and discharging. This leads to an improvement in the initial coulombic efficiency and the coulombic efficiency in the lithium-ion secondary battery. From the same viewpoint, the full width at half maximum is preferably 3.5 deg. or more, and more preferably 4.0 deg. or more. Also, the full width at half maximum is preferably 10.0 deg. or less, more preferably 8.0 deg. or less, and still more preferably 6.0 deg. or less.

In the composite particles (B) according to an embodiment, (peak intensity of 111 plane of SiC)/(peak intensity of 111 plane of Si) is preferably 0.004 or less in the XRD pattern measured by powder XRD using a Cu-Kα ray. When the ratio is 0.004 or less, it is considered that SiC (silicon carbide) is not contained in the composite particles (B), or the content of SiC is extremely low. As a result, the utilization rate of silicon as a battery active material can be improved. The (peak intensity of 111 plane of SiC)/(peak intensity of 111 plane of Si) is also referred to as $I_{SiC111}/I_{Si111}$.

The lower limit of $I_{SiC111}/I_{Si111}$ is 0.000. That is, it is more preferable that the peak of SiC is not observed. The peak intensity of the 111 plane of SiC refers to the height from the baseline to the peak top of the peak that appears in the vicinity of 35 deg. at 2θ and derived from the 111 plane of SiC in the XRD pattern. Further, the peak intensity of the 111 plane of Si refers to the height from the baseline to the peak top of the peak that appears in the vicinity of 28 deg. at 2θ and derived from the 111 plane of Si.

When the amorphous layer is a metal oxide, the content of the metal element in the composite particles (B) is preferably 0.1% by mass or more. When the content is 0.1% by mass or more, oxidation by oxygen in air can be sufficiently prevented. From this viewpoint, the content of the metal element is more preferably 0.3% by mass or more, and still more preferably 0.5% by mass or more.

The content of the metal element in the composite particles (B) is preferably 10.0% by mass or less. When the content of the metal element is 10.0% by mass or less, electron conduction on the surface of the composite particles (B) can be sufficiently rapidly performed. From this viewpoint, the content of the metal element is more preferably 9.0% by mass or less, and still more preferably 8.0% by mass or less.

The contents of the metal element and silicon in the composite particles (B) herein can be measured by ICP-AES after these elements are eluted from the composite particles (B).

When the amorphous layer contains lithium titanate ($Li_4Ti_5O_{12}$), the content of titanium (in terms of titanium) in the composite particles (B) is preferably 0.1% by mass or more. When the content is 0.1% by mass or more, oxidation by oxygen in air can be sufficiently prevented. From this viewpoint, the content of titanium is more preferably 0.3% by mass or more, and still more preferably 0.5% by mass or more.

The content of titanium in the composite particles (B) is preferably 10.0% by mass or less. When the content thereof is 10.0% by mass or less, electron conduction on the surface of the composite particles (B) can be sufficiently rapidly performed. From this viewpoint, the content of titanium is more preferably 9.0% by mass or less, and still more preferably 8.0% by mass or less. The content of titanium in the composite particles (B) can be measured by inductively coupled plasma emission spectrometry (ICP-AES) after titanium is eluted from the composite particles (B).

When the amorphous layer contains niobium pentoxide ($Nb_2O_5$) or oxygen-deficient niobium oxide ($Nb_2O_x$, x=4.5 to 4.9), the content of niobium (in terms of niobium) in the composite particles (B) is preferably 0.1% by mass or more.

When the content is 0.1% by mass or more, oxidation by oxygen in air can be sufficiently prevented. From this viewpoint, the content of niobium is more preferably 0.3% by mass or more, and still more preferably 0.5% by mass or more.

The content of niobium in the composite particles (B) is preferably 20.0% by mass or less. When the content of niobium is 20.0% by mass or less, electron conduction on the surface of the composite particles (B) can be sufficiently rapidly performed. From this viewpoint, the content of niobium is more preferably 15.0% by mass or less, and still more preferably 10.0% by mass or less.

The contents of niobium and silicon in the composite particles (B) herein can be measured by ICP-AES after these elements are eluted from the composite particles (B) as in the case of titanium.

The carbon in the amorphous layer of the composite particles (B) according to an embodiment is carbon that does not have a hexagonal net plane like graphite. Such carbon is obtained by a physical vapor deposition method, such as a sputtering method. However, the carbon may be formed of very small graphite crystals having a hexagonal net plane size of about 0.3 to 0.4 nm in size. Such carbon can be obtained by, for example, thermal decomposition of an organic substance or CVD of a hydrocarbon gas.

The amorphous may consist only of carbon. Here, "only carbon" means that the component of the amorphous layer is only carbon and does not contain other metal oxides, phosphoric acid, polyphosphoric acid (having a polymerization degree of 3 or more), and salts thereof.

By observing and analyzing the portion of the coating layer in the cross-section of the composite particles (B) using TEM-EDX, the pattern and composition of the crystal lattice can be examined, and thus it can be confirmed that the coating layer is composed of amorphous carbon. In the cross-section of the composite particles (B), the composite particles (A) and the coating layer can be distinguished from each other based on the difference in the pattern of the crystal lattice.

Examples of phosphoric acid, polyphosphoric acid (having a polymerization degree of 3 or more), and salts thereof include compounds such as anhydrous phosphoric acid $P_2O_5$, polyphosphoric acid $H_{(n+2)}P_nO_{(3n+1)}$, lanthanum phosphate $LaPO_3$, sodium tripolyphosphate $Na_5P_3O_{10}$, lanthanum tripolyphosphate $La_5(P_3O_{10})_3$, and sodium tetrapolyphosphate $Na_6P_4O_{13}$. The composite particles (A) can be obtained by coating the composite particles (A) with phosphoric acid $H_3PO_4$ followed by heat treatment, or by coating the composite particles (A) with an aqueous solution of the phosphoric acid salt followed by drying.

In an embodiment, the ratio of the phosphorus content to the silicon content of the composite particles (B) measured by X-ray fluorescence analysis (XRF) is preferably 0.05 or more and 1.00 or less.

The thickness of the amorphous layer in the composite particles (B) according to an embodiment is preferably 0.1 nm or more. When the thickness is 0.1 nm or more, oxidation by oxygen in air can be sufficiently suppressed. From this viewpoint, the thickness of the amorphous layer is more preferably 0.3 nm or more, and still more preferably 0.4 nm or more.

The thickness of the amorphous layer in the composite particles (B) according to an embodiment is preferably 30.0 nm or less. When the thickness thereof is 30.0 nm or less, electron conduction on the surface of the composite particles (B) can be sufficiently rapidly performed. From this viewpoint, the thickness of the amorphous layer is more preferably 20.0 nm or less, and still more preferably 10.0 nm or less.

The thickness of the amorphous layer herein can be measured from a TEM image of the cross-section or the end portion of the composite particles (B). When the amorphous layer is composed of one or more selected from a metal oxide, phosphoric acid, polyphosphoric acid (having a polymerization degree of 3 or more), and salts thereof, the thickness can be calculated from the concentration and density of the amorphous layer in the composite particles (B) and the specific surface area of the composite particles (B).

In the composite particles (B) according to an embodiment, the coverage of the composite particles (A) with the amorphous layer is preferably 50% or more. When the coverage is 50% or more, oxidation by oxygen in air can be sufficiently prevented. From this viewpoint, the coverage is more preferably 60% or more, and still more preferably 70% or more.

The coverage of the composite particles (A) by the amorphous layer can be determined by binarizing an image of the composite particles (B) obtained by a scanning electron microscope (SEM) with image processing software, color-coding the coating layer and the composite particles (A), determining the area of the coating layer by image processing, and determining the ratio of the area to the total area of the composite particles (B). Examples of the image processing software for binarizing the SEM image, measuring the area, and calculating the coverage includes Photoshop (developed by Adobe), but is not limited to this as long as similar processing can be performed. Further, the composition analysis image of the SEM may be obtained by image analysis.

The content of oxygen (oxygen equivalent) in the composite particles (B) according to an embodiment is preferably 20.0% by mass or less. When the oxygen content is 20.0% by mass or less, the specific capacity of the composite particles (B) can be sufficiently large. From this viewpoint, the oxygen content in the composite particles (B) is more preferably 10.0% by mass or less, and still more preferably 5.0% by mass or less.

The oxygen content can be measured by, for example, an oxygen-nitrogen simultaneous measuring apparatus.

The composite particles (B) according to an embodiment preferably have a true density of 1.80 $g/cm^3$ or more. As a result, a high energy density can be obtained. From this viewpoint, the true density of the composite particles (B) is preferably 1.90 $g/cm^3$ or more, and more preferably 2.00 $g/cm^3$ or more. The true density can be measured by the pycnometer method.

In a case where the amorphous layer coating the surfaces of the composite particles (A) is a metal oxide layer, the thickness thereof is particularly preferably 4.0 nm or less. When the thickness is 4.0 nm or less, the surface of the composite particles (B) has sufficient electron conductivity.

In the composite particles (B) according to an embodiment, in a case where the amorphous layer is a metal oxide layer, the coverage of the composite particles (A) is particularly preferably 95% or more, and most preferably 97% or more. When the coverage is 95% or more, oxidation by oxygen in air can be sufficiently prevented and side reactions with the electrolytic solution can be suppressed. The upper limit of the coverage is 100%.

To investigate the pore distribution of the composite particles (B), the composite particles (A), and the carbon material, an adsorption isotherm by a gas adsorption method, for example, is analyzed by a known method. In an embodiment, nitrogen was used as the adsorption gas.

Furthermore, the composite particles (B) according to an embodiment preferably have a silicon content of 20% by mass or more. When the content of silicon is 20% by mass or more, the composite particles (B) having a specific capacity of 840 mA/g or more in calculation can be obtained. From this viewpoint, the content of the silicon is more preferably 30% by mass or more, and still more preferably 35% by mass or more.

The composite particles (B) according to an embodiment preferably have a silicon content of 70% by mass or less. When the content of silicon is 70% by mass or less, the composite particles (B) have a sufficient portion capable of absorbing expansion and contraction of silicon in association with charging and discharging. From this viewpoint, the content of the silicon is more preferably 60% by mass or less, and still more preferably 50% by mass or less.

The BET specific surface area of the composite particles (B) according to an embodiment of the present invention is preferably 10.0 m$^2$/g or less. When the BET specific surface area is 10.0 m$^2$/g or less, side reactions with the electrolytic solution are suppressed and the initial coulombic efficiency becomes high. From the same viewpoint, the BET specific surface area is more preferably 7.0 m$^2$/g or less, and still more preferably 5.0 m$^2$/g or less.

The BET specific surface area of the composite particles (B) according to an embodiment of the present invention is preferably 0.3 m$^2$/g or more. When the BET specific surface area is 0.3 m$^2$/g or more, the resistance at the time of insertion and deinsertion of Li ions decreases. From the same viewpoint, the BET specific surface area is more preferably 0.5 m$^2$/g or more, and still more preferably 1.0 m$^2$/g or more. The BET specific surface area can be measured by a BET specific surface area measuring apparatus described later.

The 50% particle size $D_{v50}$ obtained by measuring the volume-based cumulative particle size distribution of the composite particles (B) according to an embodiment of the present invention is preferably 30.0 μm or less, more preferably 20 μm or less, and still more preferably 15 μm or less. When $D_{v50}$ is 30.0 μm or less, the handleability of the composite particles is improved, and in a case where the composite particles are used as a negative electrode material of a lithium-ion secondary battery, the surface area of the composite material can be maintained in a large state, and in a case where the composite material is used as a negative electrode material of a lithium-ion secondary battery, the resistance during insertion and deinsertion of Li ions becomes small, so that the input and output characteristics can be improved.

The 50% particle size $D_{v50}$ obtained by measuring the volume-based cumulative particle size distribution of the composite particles (B) according to an embodiment of the present invention is preferably 1.0 μm or more, more preferably 4.0 μm or more, and still more preferably 7.0 μm or more. When the $D_{50}$ is 1.0 μm or more, the handleability of the composite particles (B) is improved, and in addition, in a case where the composite particles (B) are used as a negative electrode material of a lithium-ion secondary battery, the dispersibility of the composite particles (B) in the negative electrode layer is increased and the cycle characteristics are improved.

The $D_{v50}$ is a particle size at 50% in a volume-based cumulative particle size distribution determined by a laser diffraction-scattering method.

In a case where the amorphous layer is a metal oxide layer, the composite particles (B) according to an embodiment of the present invention preferably satisfy at least one of the following conditions: two or less exothermic peaks at 400° C. to 800° C.; and no exothermic peak at 700±10° C., wherein the exothermic peaks are determined from DTA under conditions of an atmosphere air 100 ml/min and a heating rate of 10° C./min in thermal analysis (TG-DTA). This represents the oxidation inhibitory effect of oxygen in the air. From the same viewpoint, it is more preferable that both conditions are satisfied.

The amorphous layer to be coated may be either a particle or a thin film, but in the case of particles, it is desirable that the particles are not independent but connected to each other to form a plane. By forming the plane, oxidation due to oxygen in the air is prevented, and an effect of suppressing side reactions with the electrolytic solution is enhanced.

In the composite particles according to another embodiment of the present invention, it is preferable that metal oxide particles having an average particle size of 100 nm or less are adhered to the surfaces of the amorphous layers. According to this structure, the presence of metal oxide particles having a high affinity with the solid electrolyte on the surface of the composite material increases the contact area with the electrolytic solution, lowers the resistance, and improves the rate characteristics.

This structure can be confirmed by mapping by transmission electron microscope (SEM) and Raman spectroscopic analysis.

<2> Method for Producing Composite Particles (B)

The composite particles (B) according to an embodiment can be produced by the following steps (1) to (2).

Step (1): a step of producing composite particles (A) containing carbon and silicon.

Step (2): a step of providing amorphous layers on surfaces of the composite particles (A).

Step (1)

The step (1) is a step of producing composite particles (A) containing carbon and silicon.

It is preferable to use porous carbon as carbon. As used herein, the term "porous carbon" refers to carbon having a BET specific surface area of 200 m$^2$/g or more. The porous carbon is preferably such that fine silicon can be precipitated inside the pores thereof, and even when the silicon therein expands or contracts due to the insertion or deinsertion of lithium, a stress acts to maintain the structure of the pores or a space not occupied by silicon is present and is crushed, thereby reducing the degree of expansion or contraction of the negative electrode material as a whole. Specific examples of the porous carbon include activated carbon, carbon obtained by thermally decomposing a resin or an organic substance, carbon molecular sieves, active carbon fibers, aggregates of vapor grown carbon fibers, aggregates of carbon nanotubes, and inorganic template carbon.

To investigate the pore distribution of the carbon material, an adsorption isotherm by a gas adsorption method, for example, is analyzed by a known method. In an embodiment, nitrogen was used as the adsorption gas.

For example, a commercially available carbon material having a specific pore distribution may be used, but for example, a porous carbon having a desired pore distribution may be produced by adjusting the conditions for synthesizing the resin or for thermal decomposition of the resin while examining the change in the pore distribution by the method described above.

Silicon-containing gas, preferably silane gas, is allowed to act on the carbon material to precipitate silicon in the pores and on the surface of the carbon material to obtain the composite particles (A). Specifically, amorphous silicon is usually precipitated on a carbon material by a chemical vapor deposition (CVD) method using a silicon source such as silane ($SiH_4$).

Step (2)

The step (2) is a step of forming amorphous layers on the surfaces of the composite particles (A) obtained in the step (1) to obtain the composite particles (B). The method for forming the amorphous layers on the surfaces can be appropriately selected from known surface treatment methods. A wet method in which the composite particles (A) are wet-coated with the precursor of the amorphous layers, the solvent is removed, and then heat treatment is performed may be used, or a dry method such as a physical vapor deposition method (PVD) such as a sputtering method or an atomic layer deposition method (ALD) may also be used. A plurality of methods may be used in combination. The estimated base material arrival temperature (treatment temperature) is preferably 500° C. or less, more preferably 200° C. or less, and still more preferably 100° C. or less. When the temperature is 500° C. or less, the crystal structure and the surface structure of carbon and silicon contained in the composite particles (A) are not modified, which is preferable. In the case of a physical vapor deposition method such as a sputtering method (PVD) or a dry method such as an atomic layer deposition method (ALD), the film formation processing time is preferably 3.00 nm/h or less, and more preferably 2.00 nm/h or less. When the processing time is 3.00 nm/h or less, the film formation process is gentle and the surface of the composite particles is not roughened, so that the composite particles (B) having high adhesion with the amorphous layer can be obtained.

(Step (2) First Form)

The first embodiment is a step of forming amorphous layers on the surfaces of the composite particles (A) by a physical vapor deposition method (PVD) to obtain the composite particles (B).

As the physical vapor deposition method (PVD), a sputtering method is preferably used. A known method can be used for the sputtering method on the particles.

The amorphous layer formed on the surfaces of the composite particles (A) preferably contains at least one selected from the group consisting of a metal oxide, carbon, phosphoric acid, polyphosphoric acid (having a polymerization degree of 3 or more), and salts thereof, and more preferably contains at least one selected from the group consisting of a metal oxide and carbon. The metal oxide preferably contains at least one selected from the group consisting of oxides of Al, Ti, V, Cr, Hf, Fe, Co, Mn, Ni, Y, Zr, Mo, Nb, La, Ce, Ta, and W and Li-containing oxides, and particularly more preferably contains at least one selected from the group consisting of lithium titanate ($Li_4Ti_5O_{12}$), niobium pentoxide ($Nb_2O_5$), and oxygen-deficient niobium oxides ($Nb_2O_x$, x=4.5 to 4.9), and it is more preferable that the carbon contains diamond-like carbon. These can be formed on the surfaces of the composite particles (A) by using a target of these materials in a sputtering method.

(Step (2) Second Form)

The second embodiment is a step of forming amorphous layers on the surfaces of the composite particles (A) by an atomic layer deposition (ALD) method to obtain the composite particles (B). The atomic layer deposition (ALD) method is a method using chemical adsorption and chemical reaction of a plurality of low-energy gases on a support surface. A known method can be used as the ALD method for the composite particles (A).

The amorphous layer formed on the surfaces of the composite particles (A) is not particularly limited, but preferably contains at least one selected from the group consisting of oxides of Al, Ti, V, Cr, Hf, Fe, Co, Mn, Ni, Y, Zr, Mo, Nb, La, Ce, Ta, and W and Li-containing oxides, and particularly preferably any one of niobium pentoxide ($Nb_2O_5$) and lithium titanate ($Li_4Ti_5O_{12}$). By using precursors of these materials in the ALD method, a metal oxide layer can be formed on the surfaces of the composite particles (A). Examples of the precursor include a compound containing metal species such as niobium, titanium, and lithium and organic ligands such as an alcohol compound, a glycol compound, a R-diketone compound, a cyclopentadiene compound, and an organic amine compound.

(Step (2) Third Form)

The third form is a step of forming amorphous layers on the surfaces of the composite particles (A) by a wet method in which a coating liquid containing a precursor or fine particles constituting the amorphous layers is applied to obtain the composite particles (B). The coating method is not particularly limited, and examples thereof include an immersing method and a spraying method. For example, the composite particles (B) can be produced by mixing the composite particles (A) while rolling and rotating and spraying the coating liquid, and then heating the mixture.

<3> Negative Electrode Material

The composite particles (B) according to an embodiment can be used as a negative electrode material for a nonaqueous secondary battery, for example. In particular, it can be suitably used as a negative electrode material for a lithium-ion secondary battery. In an embodiment, the "negative electrode material" refers to a negative electrode active material or a composite of a negative electrode active material and another material.

As the negative electrode material, the composite particles (B) of an embodiment may be used alone or in combination with other negative electrode materials. As the other negative electrode material, an active material generally used as a negative electrode active material of a lithium-ion secondary battery can be used. In a case where other negative electrode materials are used, composite particles (B) and other negative electrode materials are usually mixed and used.

Examples of other negative electrode materials include graphite, hard carbon, lithium titanate ($Li_4Ti_5O_{12}$), alloy-based active materials such as silicon and tin, and composite materials thereof. These negative electrode materials are usually in the form of particles. The negative electrode material other than the composite particles (B) may be used alone or in combination of two or more kinds thereof. Among them, graphite and hard carbon are particularly preferably used. In one preferred embodiment, the negative electrode mixture layer described later contains the composite particles (B) and graphite particles.

In a case where the negative electrode material is formed of the composite particles (B) and another negative electrode material, the composite particles (B) preferably contain 2 to 99% by mass, more preferably 10 to 90% by mass, still more preferably 20 to 80% by mass, and particularly preferably 30 to 70% by mass per 100% by mass of the negative electrode material.

<4> Negative Electrode Mixture Layer

A negative electrode mixture layer according to an embodiment contains the negative electrode material described above. The negative electrode mixture layer of an embodiment can be used as a negative electrode mixture layer for a nonaqueous secondary battery, particularly a lithium-ion secondary battery. The negative electrode mixture layer generally contains a negative electrode material, a binder, and a conductive auxiliary agent as an optional component.

A method for producing the negative electrode mixture layer may be, for example, a known method as described below.

(1) A negative electrode material, a binder, a conductive auxiliary agent as an optional component, and a solvent are used to prepare a slurry for forming a negative electrode mixture layer.
(2) The slurry is applied to a current collector such as copper foil and dried.
(3) This is further vacuum-dried, roll-pressed, and then cut or punched out into a desired shape and size.

The pressure in the roll-pressing is usually 100 to 500 MPa. The obtained sheet may be referred to as a negative electrode sheet. The negative electrode sheet is obtained by pressing and contains a negative electrode mixture layer and a current collector. The electrode density (negative electrode mixture layer density) is not particularly limited, but is preferably 0.7 g/cm$^3$ or more, and preferably 1.8 g/cm$^3$ or less.

Any binder generally used in the negative electrode mixture layer of a lithium-ion secondary battery can be freely selected and used as the binder. Examples thereof include polyethylene, polypropylene, ethylene-propylene terpolymer, butadiene rubber, styrene-butadiene rubber, butyl rubber, acrylic rubber, polyvinylidene fluoride, polytetrafluoroethylene, polyethylene oxide, polyepichlorohydrin, polyphosphazene, polyacrylonitrile, carboxymethyl cellulose and salts thereof, polyacrylic acid, and polyacrylamide. The binder may be used alone or in combination of two or more kinds thereof. The amount of the binder is preferably 0.5 to 30 parts by mass based on 100 parts by mass of the negative electrode material.

The conductive auxiliary agent is not particularly limited as long as the conductive auxiliary agent plays a role in imparting conductivity and dimensional stability (buffering action on a volume change through insertion and deinsertion of lithium) to the electrode. Examples thereof include carbon nanotubes, carbon nanofibers, vapor grown carbon fibers (for example, "VGCF®-H" manufactured by Showa Denko K.K.), conductive carbon black (for example, "DENKA BLACK®" manufactured by Denka Company Limited, "Super C65" manufactured by Imerys Graphite & Carbon, "Super C45" manufactured by Imerys Graphite & Carbon), and conductive graphite (for example, "KS6L" manufactured by Imerys Graphite & Carbon and "SFG6L" manufactured by Imerys Graphite & Carbon). Further, two or more of the conductive auxiliary agents can be used. The amount of the conductive auxiliary agent is preferably 1 to 30 parts by mass based on 100 parts by mass of the negative electrode material.

The solvent used when preparing the slurry for electrode coating is not particularly limited. Examples thereof include N-methyl-2-pyrrolidone, dimethylformamide, isopropanol, and water. In the case of a binder using water as a solvent, a thickening agent is preferably used in combination. The amount of solvent is adjusted so that the paste achieves such viscosity that the slurry is easily applied onto a current collector.

<5> Lithium-Ion Secondary Battery

A lithium-ion secondary battery according to an embodiment contains the negative electrode mixture layer. The lithium-ion secondary battery usually contains a negative electrode containing the negative electrode mixture layer and a current collector, a positive electrode containing a positive electrode mixture layer and a current collector, at least one of a nonaqueous electrolytic solution and a nonaqueous polymer electrolyte present therebetween, a separator, and a battery case accommodating these components. As long as the lithium-ion secondary battery includes the negative electrode mixture layer, other configurations including conventionally known configurations can be employed without particular limitation.

The positive electrode mixture layer usually contains a positive electrode material, a conductive auxiliary agent, and a binder. The positive electrode in the lithium-ion secondary battery may have a general configuration in a typical lithium-ion secondary battery.

The positive electrode material is not particularly limited as long as electrochemical lithium insertion and deinsertion can be reversibly performed and the standard oxidation-reduction potential of these reactions is sufficiently higher than the standard oxidation-reduction potential of the negative electrode reaction. For example, $LiCoO_2$, $LiNiO_2$, $LiMn_2O_4$, $LiCo_{1/3}Mn_{1/3}Ni_{1/3}O_2$, carbon-coated $LiFePO_4$, or a mixture thereof can be suitably used.

As the conductive auxiliary agent, the binder, and the solvent for preparing the slurry, those described in the section of the negative electrode can be used. Aluminum foil is preferably used as the current collector.

There is no particular limitation on the nonaqueous electrolytic solution and nonaqueous polymer electrolyte used in the lithium-ion batteries. Examples of the nonaqueous electrolytic solution include an organic electrolytic solution in which a lithium salt such as $LiClO_4$, $LiPF_6$, $LiAsF_6$, $LiBF_4$, $LiSO_3CF_3$, and $CH_3SO_3Li$ is dissolved in a nonaqueous solvent such as ethylene carbonate, diethyl carbonate, dimethyl carbonate, ethyl methyl carbonate, propylene carbonate, butylene carbonate, acetonitrile, propionitrile, dimethoxyethane, tetrahydrofuran, and γ-butyrolactone.

Examples of the nonaqueous polymer electrolyte include a gel polymer electrolyte containing, for example, polyethylene oxide, polyacrylonitrile, polyvinylidene fluoride, and polymethyl methacrylate; and a solid polymer electrolyte containing, for example, a polymer having an ethylene oxide bond.

Further, a small amount of the additive used in the electrolytic solution of a lithium-ion secondary battery may be added to the nonaqueous electrolytic solution. Examples of the substance include vinylene carbonate (VC), biphenyl, propanesultone (PS), fluoroethylene carbonate (FEC), and ethylene sultone (ES). VC and FEC are preferred. The amount to be added is preferably 0.01 to 20% by mass based on 100% by mass of the nonaqueous electrolytic solution.

The separator can be freely selected from materials that can be used in general lithium-ion secondary batteries, including combinations thereof, and examples thereof include microporous films made of polyethylene or polypropylene. In addition, it is also possible to use separators obtained by mixing particles such as $SiO_2$ or $Al_2O_3$ as fillers into such separators, or separators obtained by adhering the particles to the surfaces of such separators.

The battery case is not particularly limited as long as it can accommodate the positive electrode, the negative electrode, the separator, and the electrolytic solution. In addition to those standardized in the industry such as commercially available battery packs, 18650 cylindrical cell, and coin-shaped cells, the battery case, including those packed with aluminum packaging material, for example, can be freely designed and used.

The electrodes may be stacked and packed for use. The single cells can be connected in series and used as batteries or modules.

The lithium-ion secondary battery according to an embodiment can be used as a power source for electronic devices such as smartphones, tablet PCs, and mobile information terminals; a power source for electric motors such as electric tools, vacuum cleaners, electric bicycles, drones, and electric vehicles; and storage of electric power obtained by, for example, fuel cells, solar power generation, and wind power generation.

EXAMPLES

Hereinafter, the present invention will be specifically described with reference to Examples and Comparative Examples, but the present invention is not limited to these Examples. Measurement of physical property values and battery evaluation were performed as follows.

The ratio of the contents of silicon, titanium, niobium, aluminum, yttrium, hafnium, cerium, vanadium, molybdenum, and tungsten and carbon in the composite particles (B) obtained in Examples and Comparative Examples was measured under the following conditions.

[Contents of Silicon and Titanium, Niobium, Aluminum, Yttrium, Hafnium, Cerium, Vanadium, Molybdenum, and Tungsten]

The evaluation was performed by quantitative analysis by ICP-AES.

Equipment: Agilent 5110 (Agilent technology)

In a platinum crucible, 10 mg of a sample was weighed, 1 g of potassium sodium carbonate was added thereto, the mixture was melted by a gas burner, immersed while heating in ultrapure water, and then cooled, and 2 mL of 30% by mass hydrogen peroxide solution, 5 mL of 10% by mass ammonium tartrate aqueous solution, and 5 mL of (1+4) sulfuric acid were added thereto to completely dissolve the melt. The solution was washed into a PTFE measuring flask, and 1 mL of hydrogen peroxide solution, 2 mL of (1+4) sulfuric acid, a Co standard solution, a Ga standard solution, and a Rb standard solution were added thereto such that the volume of the solution was adjusted to the 250 mL. The solution after volume determination was quantitatively analyzed by ICP-AES. The measurement was carried out at n=2.

[Carbon Content]

Measuring apparatus: HORIBA EMIA-920V

A sample of 10 to 13 mg was weighed in a ceramic crucible, a fuel additive (W powder, Sn grains) was added, and measured by a carbon-sulfur analyzer (high-frequency combustion infrared absorption method).

[Acquisition of TEM Photograph]

TEM photographs of the composite particles (B) obtained in Examples and Comparative Examples were obtained under the following conditions.

Sample Processing

The sample was processed using an ion slicer at an accelerating voltage of 4.5 kV. The composite particles (B) were embedded in a resin, sandwiched between Si auxiliary materials, and processed into thin pieces with the ion slicer.

Tem Observation

Transmission electron microscope (TEM): H9500 manufactured by Hitachi, acceleration voltage 300 kV The average thickness of the amorphous layer of the composite particles (B) was determined by the following method.

(1) One particle A1 is randomly extracted from the composite particles (B) observed by TEM.

(2) In the extracted particle A1, one portion where an amorphous layer is formed is randomly selected, and the thickness t1 of the amorphous layer in the selected part is measured. The thickness t1 is determined by determining the intersection x1 between the line perpendicular to the surface of the composite particle (A) and the composite particle (A) and the intersection x2 between the line perpendicular to the surface and the outer periphery of the amorphous layer, and measuring the distance between the obtained intersection x1 and x2.

(3) The above (1) and (2) are repeated 50 times. That is, the thicknesses t1 to t50 of the amorphous layers measured in 50 particles A1 to A50 randomly extracted from the composite particles (B) observed by the TEM are measured. None of the particles A1 to A50 randomly extracted are measured more than once.

(4) The arithmetic mean value of the obtained values t1 to t50 is taken as the average thickness t of the amorphous layer.

The average particle size of the metal oxide particles adhering to the surface of the composite particles (B) was determined by the following method.

The composite particles (B) were cross-sectioned by FIB processing and mapped by STEM/EELS to identify the primary particles of the metal oxide in the composite particles.

(1) A field of view in which one or more primary particles of the metal oxide were observed was randomly extracted from the vicinity of the surface of the composite particle observed by STEM/EELS. The magnification was a magnification at which the primary particles can be clearly recognized.

(2) In the extracted field of view, the length of each primary particle was measured 6 times using the length measurement mode of STEM/EELS while tilting at 60° so as to surely intersect at one point, and the average particle size was calculated. The above measurement was performed on 50 particles extracted at random, and the average value thereof was taken as the average particle size of the primary particles of the metal oxide particles. Other software may be used for the calculation, and the primary particles may be obtained from a secondary electron image or a transmission image as long as a contrast capable of clearly distinguishing the primary particles can be secured.

[Raman Spectroscopy Measurement]

The Raman spectroscopy of the composite particles (B) obtained in Examples and Comparative Examples was measured under the following conditions.

Microscopic Raman spectroscopic measuring apparatus: LabRAM HR Evolution manufactured by HORIBA, Ltd.

Excitation wavelength: 532 nm

Exposure time: 5 seconds

Integration: 2 times

Diffraction gratings: 300/mm (600 nm)

Measurement range: length 80 μm×width 100 μm

Number of points: 100 points evaluated at a longitudinal feed of 17.8 μm and a lateral feed of 22.2 μm Regarding the intensity of the peak, the height from the baseline to the peak top was taken as the intensity. The ratio $(I_D/I_G)$ of the intensity $I_D$ of the peak in the vicinity of 1360 cm$^{-1}$ (derived from the amorphous component) and the intensity $I_G$ of the peak in the vicinity of 1600 cm$^{-1}$ (derived from the graphite component) was calculated from the measured spectrum. This was taken as R value and used as an index of the amount of defects contained in the carbon material.

The ratio ($I_{Si}/I_G$) of the intensity $I_{Si}$ of the peak derived from amorphous silicon appearing at 450 to 495 cm$^{-1}$ to the $I_G$ was calculated, and this was used as an index of uneven distribution of the silicon at a position close to the surface inside the composite particles (B).

[Powder XRD Measurement]

A glass sample plate was filled with the particles obtained in Examples and Comparative Examples (sample plate window 18×20 mm, depth 0.2 mm), and measurement was performed under the following conditions.

XRD apparatus: SmartLab® manufactured by Rigaku Corporation

X-ray source: Cu-Kα ray

KB ray removal method: Ni filter

X-ray output: 45 kV, 200 mA

Measuring range: 10.0 to 80.0 deg.

Scan speed: 10.0 deg./min

The obtained XRD pattern was subjected to background removal and smoothing using analysis software (PDXL2, manufactured by Rigaku Corporation), and then subjected to peak fitting to determine the peak position and peak intensity. From the obtained XRD spectrum, the full width at half maximum of the peak of the 111 plane of Si, (peak intensity of 111 plane of SiC)/(peak intensity of 111 plane of Si) were determined ($I_{SiC111}/I_{Si111}$). At this time, the height from the baseline to the peak top was taken as the peak intensity.

[Oxygen Content Measurement]

The oxygen content of the particles obtained in Examples and Comparative Examples was measured under the following conditions.

Oxygen/Nitrogen/Hydrogen Analyzer: EMGA-920 Manufactured by HORIBA, Ltd.

Carrier Gas: Argon

About 20 mg of the particles obtained in Examples and Comparative Examples were weighed in nickel capsules and measured by an oxygen-nitrogen simultaneous analyzer in which the sample is melted in inert gas and the obtainable gas of infrared absorption is measured.

The oxygen content was measured immediately after the composite particles (B) were produced and after two months of storage in the atmosphere at room temperature.

[Measurement of Particle Size Distribution]

One ultra-small spatula of the particles obtained in each of Examples and Comparative Examples and two drops of a 100-fold diluted solution of an undiluted solution (32% by mass) of a nonionic surfactant (SARAYA coconut detergent high power) were added to 15 mL of water, followed by ultrasonic dispersion for 3 minutes. This dispersion was charged into a laser diffraction-type particle size distribution analyzer (LMS-2000e) manufactured by Seishin Enterprise Co., Ltd., and a volume-based cumulative particle size distribution was measured to determine 10% particle size $D_{v10}$, 50% particle size $D_{v50}$, and 90% particle size $D_{v90}$.

[True Density]

AccuPyc II 1340 manufactured by Micromeritics Instrument Corporation was used as a true density measuring apparatus, and 3 g of sample was put in a predetermined cell, and the measurement was carried out by pycnometer method. Helium was used as the gas for measuring the true density.

[Coverage]

The coverage was calculated from the binarized image obtained from the SEM image. The white area was adjusted to be an amorphous layer.

Coverage=total area of white area/total area of particles×100[%]

The specific method is as follows. The SEM was adjusted to show the entirety of one particle and an image was acquired. At that time, auto contrast was used. The acquired SEM image was opened in Photoshop (developed by Adobe), and "Image/Mode/Grayscale" was selected. Next, "Image/Adjustments/Equalize" was selected and performed. Further, "Image/Adjustments/Threshold" was selected, the threshold value was set to 110, and executed. "Quick Selection Tool" was selected, "Auto-Enhance" was checked, "Hardness" was set to 100%, "Spacing" was set to 25%, and "Diameter" was arbitrarily adjusted. The entire particle was selected, and "Image/Analysis/Record Measurements" was selected to calculate the area. Then, a white area (recognized as one domain) was selected and the area was measured in the same manner. When there were a plurality of areas, all areas were measured one by one. The total area of all white areas was calculated. Here, the lower limit of the dimension recognized as one domain was set to 0.1 µm. That is, a domain having any one of a longitudinal, lateral, or oblique dimension of 0.1 µm or less was not regarded as a domain. Such measurement was performed on arbitrary 50 particles obtained from the SEM image, and the average value thereof was taken as the coverage.

Before selecting the "Quick Selection Tool", "Image/Analysis/Set Measurement Scale/Custom" was selected, and the value of the scale bar of the SEM image was converted into pixels.

[Thermal Analysis (TG-DTA)]

Using a TG-DTA 2000 SE manufactured by NETZSCH Japan K.K., as a thermal analysis (TG-DTA) device, 13 mg of the sample was put into an alumina sample pan, and the weight increase and decrease at 25° C. to 800° C. at a flow rate of Air 100 mL/min and a heating rate of 10° C./min and the endothermic and exothermic behavior were measured.

[BET Specific Surface Area]

Using NOVA 2200e manufactured by Quantachrome Instruments as the BET specific surface area measuring device, 3 g of a sample was placed in a sample cell (9 mm×135 mm), dried at 300° C., under vacuum conditions for 1 hour, and then measurement was performed. $N_2$ was used as the gas for measuring the BET specific surface area.

[Preparation of Negative Electrode Sheet]

Styrene butadiene rubber (SBR) and carboxymethyl cellulose (CMC) were used as binders.

Specifically, an SBR aqueous dispersion in which SBR having a solid content ratio of 40% by mass was dispersed and a CMC aqueous solution in which CMC powder was dissolved were obtained.

A mixture of carbon black (SUPER C45®, manufactured by Imerys Graphite & Carbon) and vapor grown carbon fibers (VGCF®-H, manufactured by Showa Denko K.K.) at a mass ratio of 3:2 was prepared as a mixed conductive auxiliary agent.

A slurry for forming a negative electrode mixture layer was obtained by mixing 90 parts by mass of a negative electrode material obtained by mixing the composite particles (B) produced in Examples and Comparative Examples described later with graphite particles, 5 parts by mass of a mixed conductive auxiliary agent, and CMC aqueous solution corresponding to 2.5 parts by mass of CMC solid and SBR aqueous dispersion corresponding to 2.5 parts by mass of SBR solid, adding an appropriate amount of water for viscosity adjustment, and kneading the mixture using a rotation/revolution mixer (manufactured by THINKY CORPORATION).

[Negative Electrode Material]

A negative electrode material for battery evaluation was prepared by mixing 11 parts by mass of the composite particles (B) obtained in Examples described later and the composite particles of Comparative Examples with 89 parts by mass of graphite particles.

The slurry for forming a negative electrode mixture layer was uniformly applied to a copper foil having a thickness of 20 μm using a doctor blade so as to have a thickness of 150 μm, dried on a hot plate, and then vacuum-dried to obtain a negative electrode sheet. The dried negative electrode sheet was pressed with a uniaxial press at a pressure of 300 MPa to obtain a negative electrode sheet for battery evaluation. The thickness of the obtained negative electrode sheet was 62 μm including the thickness of the copper foil.

[Measurement of Electrode Density]

The negative electrode sheet (current collector+negative electrode mixture layer) after pressing was punched out into a circular shape having a diameter of 16 mm, and its mass and thickness were measured. The mass and thickness of the negative electrode mixture layer were determined by subtracting from these values the mass and thickness of the current collector (circular shape with diameter of 16 mm) that had been measured separately, and the mass of the negative electrode mixture and the electrode density (negative electrode mixture layer density) per unit area were calculated from the mass and thickness of the negative electrode mixture layer and the diameter (16 mm). The electrode density is not particularly limited, but is preferably 0.7 g/cm$^3$ or more, and preferably 1.8 g/cm$^3$ or less.

In a cell case (inner diameter: approximately 18 mm) with a screwed-type lid made of polypropylene, the separator (microporous film made of polypropylene) was interposed between the above negative electrode and a metal lithium foil punched out into a size of 16 mmΦ, and an electrolytic solution was added into the cell case to obtain a cell for testing (lithium counter electrode cell). Here, in the lithium counter electrode cell, the negative electrode is referred to as a sample electrode, and the lithium electrode is referred to as a counter electrode.

The electrolytic solution in the lithium counter electrode cell is obtained by mixing 1% by mass of vinylene carbonate (VC) and 10% by mass of fluoroethylene carbonate (FEC) in a solvent in which ethylene carbonate, ethyl methyl carbonate, and diethyl carbonate are mixed at a volume ratio of 3:5:2, and the electrolyte LiPF$_6$ is further dissolved therein to a concentration of 1 mol/L.

[Measurement Test of Initial Li Insertion/Deinsertion Specific Capacity and Initial Coulombic Efficiency]

The test was conducted using a lithium counter electrode cell. A constant current (CC) discharging was performed from OCV to 0.005 V at a current value of 0.1 C. Next, the discharging was switched to constant voltage (CV) discharging at 0.005V, and the discharging was performed at a cut-off current value of 0.005 C. The specific capacity at this time is taken as the initial Li insertion specific capacity. Charging was performed at a current value of 0.1 C in CC mode with an upper limit voltage of 1.5 V. The specific capacity at this time is taken as the initial Li deinsertion specific capacity.

The test was conducted in a constant temperature bath set at 25° C. At this time, the specific capacity is a value obtained by dividing the capacity by the mass of the negative electrode material. The ratio of the initial Li deinsertion specific capacity to the initial Li insertion specific capacity was expressed as a percentage, and the result was taken as the initial coulombic efficiency.

[Calculation of Initial Li Deinsertion Specific Capacity of Composite Particles (B)]

From the value of the initial Li deinsertion capacity by the lithium counter electrode cell, the Li deinsertion capacity of the graphite particles, and the mass of the composite particles (B) used, the initial Li deinsertion specific capacity of the composite particles (B) was determined by the following equation.

(Initial Li deinsertion specific capacity of composite particles (*B*))=(Initial Li deinsertion capacity−Initial Li deinsertion capacity of graphite)/(Mass of composite particles (*B*) in sample electrode)

The initial Li deinsertion specific capacity of graphite particles was investigated by charge/discharge measurement of a lithium counter electrode cell using graphite particles as a sample electrode which was prepared separately.

The initial Li deinsertion capacity of the composite particles (B) was measured immediately after the composite particles (B) were produced and after two months of storage in the atmosphere at room temperature.

[Calculation of Si Utilization Rate]

The Si utilization rate (%) was determined by dividing the value of the initial Li insertion specific capacity of the lithium counter electrode cell by the silicon content in the sample, dividing the resulting value by the theoretical value of Li insertion specific capacity of silicon (4200 mAh/g), and multiplying by 100. That is, the following equation is used.

(Si utilization rate)=100×{(initial insertion specific capacity)/(silicon content)}/4200(%)

Preparation methods, sources, and physical property values of the raw materials for the negative electrode material (carbon material, composite particles (A), composite particles (B), and graphite particles) are shown below.

[Carbon Material]

Commercially available active carbon with a BET specific surface area of 1700 m$^2$/g and a particle size of $D_{v50}$ of 9.2 μm was used as a carbon material.

[Graphite Particles]

Commercial artificial graphite particles having a BET specific surface area of 2.7 m$^2$/g, a $D_{v10}$ of 7 μm, a $D_{v50}$ of 14 μm, a $D_{v90}$ of 27 μm, a tap density of 0.98 g/cc, a specific capacity of 372 mAh/g, and an initial coulombic efficiency of 92% were used.

[Composite Particles (A)]

The carbon material was treated for 8 hours at a set temperature of 450° C., a pressure of 760 torr and a flow rate of 100 sccm in a tube furnace having a silane gas flow of 1.3% by volume mixed with nitrogen gas to precipitate silicon on the surface and inside of the carbon material, thereby obtaining the composite particles (A). The composite particles (A) had a $D_{v50}$ of 9.2 μm, a BET specific surface area of 2.1 m$^2$/g, and a silicon content of 43% by mass.

[Composite Particles (B)]

Examples 1-1 to 1-22, Comparative Examples 1-3 and 1-5

In each of the Examples and Comparative Examples, in the compounds shown in Table 1-1 in the ratio shown in Table 1-1, the composite particles (A) were charged into a barrel sputtering apparatus (PVD: manufactured by Toshima Manufacturing Co., Ltd.) or an atomic layer deposition fluidized bed (ALD: manufactured by Delft IMP), and the each material was formed on the surfaces of the composite particles (A) under the conditions shown in Table 1-1 to obtain the composite particles (B). The physical properties of the composite particles (B) and the results of the battery evaluation are shown in Tables 1-1 to 1-3.

Example 1-23

The composite particles (A) were charged into a barrel sputtering apparatus (PVD: manufactured by Toshima Manufacturing Co., Ltd.), and film formation was performed on the surfaces of the composite particles (A) using diamond-like carbon at 80° C. under the conditions shown in Table 1, and then film formation was performed using $Nb_2O_5$ at 380° C. to obtain composite particles (B). The physical properties of the composite particles (B) and the results of the battery evaluation are shown in Table 1-3.

Example 1-24

Into a tumbling/fluidizing coating apparatus (MP-01_mini, manufactured by Powrex Corporation), 600 g of the composite particles (A) was charged, and mixing was performed while spraying the coating solution in a nitrogen atmosphere adjusted to 80° C. and 1 vol % of air. The obtained mixture was heat-treated in an electric tubular furnace at 380° C. under a nitrogen atmosphere under the following conditions to obtain the composite particles (B). The physical properties of the composite particles (B) and the results of the battery evaluation are shown in Tables 1-1 to 1-3.
   Coating solution
      Pentaethoxyniobium (manufactured by Kojundo Chemical Laboratory Co., Ltd.) 13.5 g
      Dehydrated ethanol (manufactured by KANTO CHEMICAL CO., INC.) 76.5 g
   After being prepared at −60° C. being the dew point, the solution was allowed to stand for one month to generate fine particles of 100 nm or less in advance.
   Operating conditions of tumbling/fluidizing coating apparatus
      Rotor: standard
      Filter: FPM
      Mesh: 800M
      Nozzle type: NPX-II
      Nozzle diameter: 1.2 mm
      Nozzle position: tangent
      Number of nozzles: 1
      Rotor rotation speed: 400 rpm
      Spray air pressure: 0.17 (MPa)
      Blow-off pressure: 0.2 (MPa)
      Filter withdrawal time/interval: 4.0/0.3 (see/sec)
      Spray speed: 2 g/cc
   Heat treatment (electric tubular furnace)
      Maximum temperature retention time: 1 hour
      Heating rate: 150° C./h
      Cooling rate: 150° C./h Comparative Example 1-1

The composite particles (A) were used as it were as the composite particles (B). The physical properties and the results of the battery evaluation are shown in Tables 1-1 to 1-3.

Comparative Example 1-2

A chemical vapor deposition method (CVD) was performed on the composite particles (A) to form amorphous layers on the surfaces. Propane was used as a raw material gas and was thermally decomposed at 1050° C. to form a film of amorphous carbon on the surfaces of the composite particles (A) to obtain the composite particles (B). The physical properties of the composite particles (B) and the results of the battery evaluation are shown in Tables 1-1 to 1-3.

Comparative Example 1-4

First, 100 parts by mass of the composite particles (A) and 3 parts by mass of polyvinyl alcohol (PVA) were mixed and kneaded for 30 minutes while heating at 200° C. Then, a heat treatment at 300° C. was performed for 10 minutes in a firing furnace under a nitrogen atmosphere to obtain the composite particles (B). The physical properties of the composite particles (B) and the results of the battery evaluation are shown in Tables 1-1 to 1-3.

The above conditions and results are summarized in Table 1.

Further, FIG. 1 shows TEM photographs of an end portion of composite particles (B) of Example 1-5. In FIG. 1, reference numeral A indicates an amorphous layer.

The Raman spectrum of Example 1-1 is shown in FIG. 2.

The Raman spectra of Examples 1-8 and Comparative Examples 1-3 are shown in FIGS. 3 and 4, respectively. The XRD patterns before the processing by the analysis software of Examples 1-1 and 1-2 and Comparative Example 1-1 are shown in FIGS. 5 to 7, respectively.

The SEM images of Example 1-1 and Comparative Example 1-1 are shown in FIGS. 8 and 9.

TABLE 1-1

| | | | Film formation conditions | | |
|---|---|---|---|---|---|
| | Film formation technique | Target | Target density (g/cm³) | Estimated base material arrival temperature (° C.) | Film formation processing time (nm/h) |
| Ex. 1-1 | PVD | $Nb_2O_x$ ($x$ = 4.8-4.9) | 4.52 | 80-100 | 0.84 |
| Ex. 1-2 | PVD | $Li_4Ti_5O_{12}$ | 2.55 | 80-100 | 0.84 |
| Ex. 1-3 | PVD | Diamond-like carbon (DLC) | 1.75 | 80-100 | 1.98 |
| Ex. 1-4 | PVD | $Nb_2O_5$ | 4.52 | 80-100 | 0.84 |
| Ex. 1-5 | ALD | (tert-Butylimido)bis(dimethylamino)(cyclopentadien)yl)Niobium | — | 150-400 | — |

TABLE 1-1-continued

| | | | | | | |
|---|---|---|---|---|---|---|
| Ex. 1-6 | ALD | (tert-Butylimido)bis(dimethylamino)(cyclopentadienyl)Niobium | — | 150-400 | — |
| Ex. 1-7 | ALD | (tert-Butylimido)bis(dimethylamino)(cyclopentadienyl)Niobium | — | 150-400 | — |
| Ex. 1-8 | ALD | (tert-Butylimido)bis(dimethylamino)(cyclopentadienyl)Niobium | — | 150-400 | — |
| Ex. 1-9 | PVD | $Al_2O_3$ | 3.89 | 80-100 | 0.84 |
| Ex. 1-10 | PVD | $LiAlO_2$ | 2.51 | 80-100 | 0.84 |
| Ex. 1-11 | PVD | $Y_2O_3$ | 4.81 | 80-100 | 0.84 |
| Ex. 1-12 | PVD | $LiYO_2$ | 3.54 | 80-100 | 0.84 |
| Ex. 1-13 | PVD | $HfO_2$ | 9.55 | 80-100 | 0.84 |
| Ex. 1-14 | PVD | $LiHfO_3$ | 6.10 | 80-100 | 0.84 |
| Ex. 1-15 | PVD | $CeO_2$ | 7.01 | 80-100 | 0.84 |
| Ex. 1-16 | PVD | $LiCeO_2$ | 5.66 | 80-100 | 0.84 |
| Ex. 1-17 | PVD | $V_2O_5$ | 3.24 | 80-100 | 0.84 |
| Ex. 1-18 | PVD | $LiVO_3$ | 2.72 | 80-100 | 0.84 |
| Ex. 1-19 | PVD | $MoO_3$ | 4.47 | 80-100 | 0.84 |
| Ex. 1-20 | PVD | $Li_2MoO_4$ | 2.53 | 80-100 | 0.84 |
| Ex. 1-21 | PVD | $WO_3$ | 6.96 | 80-100 | 0.84 |
| Ex. 1-22 | PVD | $Li_2WO_4$ | 3.51 | 80-100 | 0.84 |
| Ex. 1-23 | PVD | $C/Nb_2O_5$ | 4.52/1.75 | 80-100 | 0.84 |
| Ex. 1-24 | Wet method | $Nb_2O_5$ | — | 80/380 | 5.0 |
| Comp. Ex. 1-1 | None | None | — | — | — |
| Comp. Ex. 1-2 | CVD | Propane | — | 1050 | — |
| Comp. Ex. 1-3 | ALD | (tert-Butylimido)bis(dimethylamino)(cyclopentadienyl)Niobium | — | 150-400 | — |
| Comp. Ex. 1-4 | Solid phase method | PVA | — | 300 | — |
| Comp. Ex. 1-5 | PVD | $Nb_2O_x$ (X = 4.8-4.9) | 4.52 | 80-100 | 4.2 |

| | Physical properties of composite particles | | | | | |
|---|---|---|---|---|---|---|
| | True density (g/cm³) | R value ($I_D/I_G$) | Peak position of Raman Si (cm⁻¹) | $I_{Si}/I_G$ | XRD (Full width at half maximum of peak of 111 plane of Si: deg.) | XRD (Peak intensity ratio: $I_{SiC111}/I_{Si111}$) |
| Ex. 1-1 | 1.97 | 1.14 | 465 | 0.32 | 4.7 | 0.000 |
| Ex. 1-2 | 1.89 | 1.18 | 465 | 0.33 | 5.1 | 0.000 |
| Ex. 1-3 | 1.93 | 1.13 | 465 | 0.30 | 4.3 | 0.000 |
| Ex. 1-4 | 1.97 | 1.14 | 465 | 0.32 | 4.9 | 0.000 |
| Ex. 1-5 | 1.95 | 1.10 | 465 | 0.17 | 4.7 | 0.000 |
| Ex. 1-6 | 1.93 | 1.12 | 465 | 0.18 | 4.9 | 0.000 |
| Ex. 1-7 | 1.98 | 1.06 | 465 | 0.17 | 5.2 | 0.000 |
| Ex. 1-8 | 2.04 | 1.01 | 465 | 0.11 | 4.8 | 0.000 |
| Ex. 1-9 | 1.94 | 1.14 | 465 | 0.32 | 4.9 | 0.000 |
| Ex. 1-10 | 1.93 | 1.13 | 465 | 0.31 | 4.7 | 0.000 |
| Ex. 1-11 | 1.95 | 1.14 | 465 | 0.32 | 4.9 | 0.000 |
| Ex. 1-12 | 1.93 | 1.14 | 465 | 0.32 | 4.8 | 0.000 |
| Ex. 1-13 | 1.99 | 1.15 | 465 | 0.33 | 4.8 | 0.000 |
| Ex. 1-14 | 1.96 | 1.13 | 465 | 0.32 | 4.7 | 0.000 |
| Ex. 1-15 | 1.96 | 1.14 | 465 | 0.32 | 4.9 | 0.000 |
| Ex. 1-16 | 1.94 | 1.14 | 465 | 0.32 | 4.9 | 0.000 |
| Ex. 1-17 | 1.94 | 1.13 | 465 | 0.32 | 4.8 | 0.000 |
| Ex. 1-18 | 1.93 | 1.14 | 465 | 0.31 | 4.7 | 0.000 |
| Ex. 1-19 | 1.95 | 1.14 | 465 | 0.32 | 4.9 | 0.000 |
| Ex. 1-20 | 1.93 | 1.15 | 465 | 0.32 | 4.9 | 0.000 |
| Ex. 1-21 | 1.96 | 1.14 | 465 | 0.32 | 4.8 | 0.000 |
| Ex. 1-22 | 1.93 | 1.14 | 465 | 0.32 | 4.9 | 0.000 |
| Ex. 1-23 | 1.91 | 1.14 | 465 | 0.32 | 4.5 | 0.000 |
| Ex. 1-24 | 1.94 | 1.14 | 465 | 0.32 | 4.5 | 0.000 |
| Comp. Ex. 1-1 | 1.93 | 1.10 | 465 | 0.34 | 5.1 | 0.000 |
| Comp. Ex. 1-2 | 2.05 | 0.85 | 480 | 0.05 | 1.9 | 0.500 |
| Comp. Ex. 1-3 | 2.23 | 0.89 | 465 | 0.08 | 5.2 | 0.000 |
| Comp. Ex. 1-4 | 1.93 | 1.15 | 465 | 0.07 | 5.2 | 0.000 |
| Comp. Ex. 1-5 | 1.97 | 1.35 | 465 | 0.24 | 4.6 | 0.000 |

TABLE 1-2

| | | | | | | | Physical properties of composite particles | | | |
|---|---|---|---|---|---|---|---|---|---|---|
| | Film formation components | Content in terms of metal element (% by mass) | Amorphous layer thickness (TEM: nm) | Coverage (%) | Si content (% by mass) | Oxygen content (% by mass) | BET specific surface area (m²/g) | $D_{v50}$ (μm) | Exothermic peaks at 400° C.-800° C. | Exothermic peaks at 700 ± 10° C. |
| Ex. 1-1 | $Nb_2O_x$ (x = 4.8-4.9) (amorphous) | Nb: 0.5 | 1.8 | 80 | 41 | 2.9 | 3.2 | 9.4 | 2 | None |
| Ex. 1-2 | $Li_4Ti_5O_{12}$ (amorphous) | Ti: 0.4 | 1.4 | 80 | 42 | 3.1 | 2.2 | 9.2 | 2 | None |
| Ex. 1-3 | C (amorphous) | — | 4.5 | 85 | 40 | 1.3 | 1.4 | 9.4 | 3 | Yes |
| Ex. 1-4 | $Nb_2O_5$ (amorphous) | Nb: 0.5 | 1.8 | 75 | 41 | 2.9 | 3.4 | 9.4 | 2 | None |
| Ex. 1-5 | $Nb_2O_5$ (amorphous) | Nb: 0.9 | 1.3 | 95 | 39 | 3.7 | 2.3 | 9.3 | 2 | None |
| Ex. 1-6 | $Nb_2O_5$ (amorphous) | Nb: 0.6 | 0.6 | 95 | 40 | 3.2 | 2.0 | 9.2 | 2 | None |
| Ex. 1-7 | $Nb_2O_5$ (amorphous) | Nb: 1.0 | 1.7 | 95 | 39 | 4.5 | 2.5 | 9.4 | 2 | None |
| Ex. 1-8 | $Nb_2O_5$ (amorphous) | Nb: 3.0 | 4.8 | 95 | 36 | 6.8 | 2.9 | 9.5 | 2 | None |
| Ex. 1-9 | $Al_2O_3$ (amorphous) | Al: 0.5 | 2.3 | 85 | 41 | 3.1 | 3.2 | 9.3 | 2 | None |
| Ex. 1-10 | $LiAlO_2$ (amorphous) | Al: 0.4 | 2.4 | 85 | 42 | 3.5 | 3.1 | 9.2 | 2 | None |
| Ex. 1-11 | $Y_2O_3$ (amorphous) | Y: 0.8 | 3.1 | 80 | 41 | 2.9 | 2.9 | 9.3 | 2 | None |
| Ex. 1-12 | $LiYO_2$ (amorphous) | Y: 0.5 | 3.2 | 80 | 41 | 3.1 | 2.8 | 9.2 | 2 | None |
| Ex. 1-13 | $HfO_2$ (amorphous) | Hf: 1.1 | 2.5 | 80 | 39 | 3.2 | 2.7 | 9.3 | 2 | None |
| Ex. 1-14 | $LiHfO_3$ (amorphous) | Hf: 0.9 | 2.6 | 80 | 40 | 3.6 | 2.6 | 9.3 | 2 | None |
| Ex. 1-15 | $CeO_2$ (amorphous) | Ce: 1.0 | 3.2 | 80 | 40 | 3.1 | 2.8 | 9.3 | 2 | None |
| Ex. 1-16 | $LiCeO_2$ (amorphous) | Ce: 0.8 | 3.0 | 80 | 40 | 3.4 | 2.6 | 9.3 | 2 | None |
| Ex. 1-17 | $V_2O_5$ (amorphous) | V: 0.4 | 2.1 | 85 | 40 | 3.2 | 3.3 | 9.2 | 2 | None |
| Ex. 1-18 | $LiVO_3$ (amorphous) | V: 0.4 | 2.5 | 85 | 40 | 3.6 | 3.3 | 9.3 | 2 | None |
| Ex. 1-19 | $MoO_3$ (amorphous) | Mo: 0.6 | 3.1 | 85 | 40 | 3.2 | 3.5 | 9.2 | 2 | None |
| Ex. 1-20 | $Li_2MoO_4$ (amorphous) | Mo: 0.4 | 3.0 | 85 | 40 | 3.5 | 3.6 | 9.3 | 2 | None |
| Ex. 1-21 | $WO_3$ (amorphous) | W: 1.0 | 2.5 | 80 | 39 | 3.1 | 3.6 | 9.2 | 2 | None |
| Ex. 1-22 | $Li_2WO_4$ (amorphous) | W: 0.6 | 2.5 | 80 | 40 | 3.5 | 3.6 | 9.3 | 2 | None |
| Ex. 1-23 | C (amorphous)/ $Nb_2O_5$ (amorphous) | Nb: 2.4 | 4.1 | 90 | 40 | 2.9 | 2.2 | 9.5 | 2 | None |
| Ex. 1-24 | $Nb_2O_5$ (amorphous) | Nb: 3.5 | 7.1 | 75 | 40 | 3.1 | 4.8 | 9.7 | 2 | None |
| Comp. Ex. 1-1 | None | — | — | 0 | 43 | 2.0 | 2.1 | 9.2 | 3 | Yes |
| Comp. Ex. 1-2 | C(amorphous) | — | 60 | 90 | 42 | 2.3 | 1.5 | 9.9 | 3 | Yes |
| Comp. Ex. 1-3 | $Nb_2O_5$ (amorphous) | Nb: 14.7 | 35 | 95 | 30 | 15.4 | 3.6 | 9.8 | 2 | None |
| Comp. Ex. 1-4 | C (amorphous) | — | 30 | 90 | 42 | 2.9 | 1.8 | 9.7 | 3 | Yes |
| Comp. Ex. 1-5 | $Nb_2O_x$ (X = 4.8-4.9) (Amorphous) | Nb: 7.1 | 11.0 | 70 | 38 | 4.2 | 4.2 | 10.2 | 2 | None |

TABLE 1-3

| | Battery characteristics | | | | Battery characteristics after storage for 2 months | | |
|---|---|---|---|---|---|---|---|
| | Si utilization rate (%) | Li insertion specific capacity (mAh/g) | Li deinsertion specific capacity (mAh/g) | Initial coulombic efficiency (%) | Oxygen content after storage for 2 months (% by mass) | Increase rate of oxygen content after storage for 2 months (%) | Initial coulombic efficiency of assembled battery after storage for 2 months (%) |
| Ex. 1-1 | 95.0 | 598 | 549 | 91.8 | 3.9 | 34 | 91.7 |
| Ex. 1-2 | 95.0 | 606 | 558 | 92.1 | 3.6 | 16 | 92.1 |
| Ex. 1-3 | 95.0 | 606 | 558 | 92.1 | 1.7 | 31 | 92.0 |
| Ex. 1-4 | 95.0 | 598 | 549 | 91.8 | 3.9 | 34 | 91.7 |
| Ex. 1-5 | 95.0 | 581 | 531 | 91.4 | 4.5 | 22 | 91.4 |
| Ex. 1-6 | 95.0 | 580 | 531 | 91.5 | 4.5 | 41 | 91.5 |
| Ex. 1-7 | 95.0 | 580 | 529 | 91.2 | 6.2 | 37 | 91.2 |
| Ex. 1-8 | 95.0 | 574 | 519 | 90.4 | 8.6 | 26 | 90.4 |
| Ex. 1-9 | 95.0 | 600 | 544 | 90.7 | 3.6 | 17 | 90.7 |
| Ex. 1-10 | 95.0 | 596 | 543 | 91.1 | 4.2 | 21 | 91.1 |
| Ex. 1-11 | 95.0 | 599 | 543 | 90.7 | 3.4 | 16 | 90.7 |
| Ex. 1-12 | 95.0 | 595 | 544 | 91.4 | 3.7 | 20 | 91.4 |
| Ex. 1-13 | 95.0 | 597 | 540 | 90.5 | 3.7 | 16 | 90.5 |
| Ex. 1-14 | 95.0 | 590 | 541 | 91.7 | 4.3 | 19 | 91.7 |
| Ex. 1-15 | 95.0 | 597 | 542 | 90.8 | 3.6 | 17 | 90.8 |
| Ex. 1-16 | 95.0 | 592 | 542 | 91.6 | 4.1 | 20 | 91.5 |
| Ex. 1-17 | 95.0 | 610 | 562 | 92.1 | 4.1 | 29 | 92.0 |
| Ex. 1-18 | 95.0 | 605 | 560 | 92.6 | 4.7 | 30 | 92.5 |
| Ex. 1-19 | 95.0 | 606 | 555 | 91.6 | 4.3 | 33 | 91.5 |
| Ex. 1-20 | 95.0 | 601 | 553 | 92.0 | 4.8 | 36 | 91.9 |
| Ex. 1-21 | 95.0 | 607 | 556 | 91.6 | 4.2 | 34 | 91.5 |
| Ex. 1-22 | 95.0 | 601 | 552 | 91.8 | 4.7 | 35 | 91.7 |
| Ex. 1-23 | 95.0 | 610 | 560 | 91.8 | 3.9 | 33 | 91.7 |
| Ex. 1-24 | 95.0 | 606 | 553 | 91.3 | 4.2 | 36 | 91.2 |
| Comp. Ex. 1-1 | 95.0 | 591 | 543 | 91.8 | 3.6 | 80 | 90.6 |
| Comp. Ex. 1-2 | 50.0 | 421 | 379 | 90.0 | 3.1 | 35 | 89.3 |
| Comp. Ex. 1-3 | 80.0 | 533 | 469 | 88.0 | 21.0 | 36 | 87.1 |
| Comp. Ex. 1-4 | 80.0 | 531 | 480 | 90.4 | 3.5 | 21 | 90.3 |
| Comp. Ex. 1-5 | 95.0 | 591 | 543 | 91.8 | 5.9 | 40 | 90.2 |

(The amorphous layer component of Example 1-3 and Comparative Examples 1-2 and 1-4 was carbon, and the content measured was indistinguishable from the weight of the composite particles (A), so no data were available.)

From Table 1, the following were considered.

From the results of Examples and Comparative Examples, it is found that the composite particles (B) having R value and a value of $I_{Si}/I_G$ of the Raman spectrum which satisfy the predetermined range have high initial coulombic efficiency both immediately after preparation and after storage for 2 months.

According to Examples 1-1 to 1-4, it is found that when the material of the amorphous layer is $Nb_2O$, LTO, C, or $Nb_2O_5$ and the physical property values satisfy the predetermined range of the present invention as shown in Table 1, natural oxidation of the composite particles (B) can be prevented, and battery characteristics considered to be good can be obtained.

From the results of Examples 1-5 to 1-8, it is found that the oxidation of the composite particles (B) can be prevented even with the metal oxide layers by ALD, and that battery characteristics considered to be good can be obtained.

From the results of Examples 1-9 to 1-22, it is found that by using the oxides of Al, V, Hf, Y, Mo, Ce, and W described herein and the Li-containing oxide as the metal oxide, the composite particles (B) having R values and $I_{Si}/I_G$ values of Raman spectra in the predetermined range can be prepared in the same manner as in Examples 1-1 to 1-8, and the natural oxidation of the composite particles (B) can be prevented, and the battery characteristics considered to be good can be obtained in the same manner.

From the results of Example 1-23, it is found that even when $Nb_2O_x$ and carbon are used in combination, the composite particles (B) having R values and $I_{Si}/I_G$ values of Raman spectra in the predetermined range can be prepared in the same manner as in Examples 1-1 to 1-8, and the natural oxidation of the composite particles (B) can be prevented, and the battery characteristics considered to be good can be obtained in the same manner. Furthermore, from the results of Example 1-24, it is found that even in the coated metal oxide layer applied by wet method, the oxidation of the composite particles (B) can be prevented, and the battery characteristics considered to be good can be obtained in the same manner as in Examples 1-1 to 1-23.

It is found that oxidation could not be prevented in Comparative Example 1-1 because the amorphous layer was not present.

It is found that R value of the Raman spectrum and $I_{Si}/I_G$ were small in Comparative Example 1-2 and the carbon coating layer was thickened, and as a result, the silicon utilization rate decreased and the capacity decreased. Further, the full width at half maximum of the peak of the 111 plane of Si was also small, indicating that the initial coulombic efficiency decreased as the crystallinity of silicon increased due to heat treatment at high temperatures.

It is found that the thickness of the amorphous layer was thick and R value of the Raman spectrum and $I_{Si}/I_G$ were small in Comparative Example 1-3, and as a result, the silicon utilization rate decreased and the capacity decreased. In addition, since the oxygen content was high, oxidation of silicon easily proceeded, and the initial coulombic efficiency (%) of the assembled battery after storage for 2 months also decreased.

It is understood that although the surface was coated with PVA by a solid phase method in Comparative Example 1-4, $I_{Si}/I_G$ was small as a result of the thickening of the amorphous layer so that the silicon utilization rate decreased and the capacity decreased.

It is considered that the initial coulombic efficiency (%) of the battery assembled after storage for 2 months also decreased in Comparative Example 1-5, because R value increased as a result of extending the film formation processing time and the adhesion with the amorphous layer decreased due to too many defects of the carbon material.

The invention claimed is:

1. Composite particles (B) comprising:
   composite particles (A) containing carbon and silicon; and
   amorphous layers coating surfaces thereof,
   wherein the composite particles (B) have $I_{Si}/I_G$ of 0.10 or more and 0.65 or less, and have R value ($I_D/I_G$) of 1.00 or more and 1.30 or less,
   when a peak due to silicon is present at 450 to 495 cm$^{-1}$, an intensity of the peak is defined as $I_{Si}$, an intensity of a G band (peak intensity in the vicinity of 1600 cm$^{-1}$) is defined as $I_G$, and an intensity of a D band (peak intensity in the vicinity of 1360 cm$^{-1}$) is defined as $I_D$ in a Raman spectrum, and
   wherein the composite particles (B) have a full width at half maximum of a peak of a 111 plane of Si of 3.0 deg. or more using a Cu-Kα ray in an XRD pattern.

2. The composite particles (B) according to claim 1, wherein (peak intensity of a 111 plane of SiC)/(peak intensity of the 111 plane of Si) is 0.004 or less in the XRD pattern of the composite particles (B) using the Cu-Kα ray.

3. The composite particles (B) according to claim 1, wherein the amorphous layers coating the surfaces of the composite particles (A) are layers containing at least one selected from the group consisting of a metal oxide and carbon.

4. The composite particles (B) according to claim 3, wherein the metal oxide in the amorphous layers coating the surfaces of the composite particles (A) contains at least one selected from the group consisting of oxides of Al, Ti, V, Cr, Hf, Fe, Co, Mn, Ni, Y, Zr, Mo, Nb, La, Ce, Ta, and W and Li-containing oxides.

5. The composite particles (B) according to claim 4, wherein a content of the metal element is 0.1% by mass or more and 10.0% by mass or less.

6. The composite particles (B) according to claim 3, wherein the metal oxide in the amorphous layers coating the surfaces of the composite particles (A) is lithium titanate ($Li_4Ti_5O_{12}$), and a content of titanium in the composite particles (B) is 0.1% by mass or more and 10.0% by mass or less.

7. The composite particles (B) according to claim 3, wherein the metal oxide in the amorphous layers coating the surfaces of the composite particles (A) is niobium pentoxide ($Nb_2O_5$) or oxygen-deficient niobium oxide ($Nb_2O_x$, x=4.5 to 4.9), and a content of niobium in the composite particles (B) is 0.1% by mass or more and 20.0% by mass or less.

8. The composite particles (B) according to claim 3, wherein the amorphous layers coating the surfaces of the composite particles (A) contains only carbon.

9. The composite particles (B) according to claim 1, wherein the amorphous layers coating the surfaces of the composite particles (A) have a thickness of 0.1 nm or more and 30 nm or less.

10. The composite particles (B) according to claim 1, wherein the amorphous layers coating the surfaces of the composite particles (A) have a coverage of 50% or more.

11. The composite particles (B) according to claim 1, wherein an oxygen content in the composite particles (B) is 10% by mass or less.

12. The composite particles (B) according to claim 1, wherein a content of silicon in the composite particles (B) is 20% by mass or more and 70% by mass or less.

13. The composite particles (B) according to claim 1, wherein the composite particles (B) have a $D_{v50}$ of 1.0 μm or more and 30.0 μm or less and a BET specific surface area of 0.3 m$^2$/g or more and 10.0 m$^2$/g or less.

14. The composite particles (B) according to claim 1, wherein the composite particles (B) satisfy at least either of presence of two exothermic peaks at 400° C. to 800° C., and absence of exothermic peak at 700±10° C., in thermal analysis in an air atmosphere.

15. The composite particles (B) according to claim 1, wherein metal oxide particles having an average particle size of 100 nm or less are adhered to the surfaces of the composite particles (B).

16. A method for producing the composite particles (B) according to claim 1, wherein the surfaces of the composite particles (A) are coated with amorphous layers by a physical vapor deposition method (PVD).

17. A method for producing the composite particles (B) according to claim 1, wherein the surfaces of the composite particles (A) are coated with metal oxide layers by an atomic layer deposition method (ALD).

18. A negative electrode material comprising the composite particles (B) according to claim 1.

19. A negative electrode mixture layer comprising the negative electrode material according to claim 18.

20. A lithium-ion secondary battery comprising the negative electrode mixture layer according to claim 19.

* * * * *